US011265244B2

(12) United States Patent
Zheng et al.

(10) Patent No.: US 11,265,244 B2
(45) Date of Patent: Mar. 1, 2022

(54) DATA TRANSMISSION METHOD, PNF SDN CONTROLLER, VNF SDN CONTROLLER, AND DATA TRANSMISSION SYSTEM

(71) Applicant: Huawei Technologies Co., Ltd., Shenzhen (CN)

(72) Inventors: Ruobin Zheng, Shenzhen (CN); Wenle Yang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 74 days.

(21) Appl. No.: 16/815,454

(22) Filed: Mar. 11, 2020

(65) Prior Publication Data

US 2020/0213226 A1 Jul. 2, 2020

Related U.S. Application Data

(63) Continuation of application No. PCT/CN2018/094709, filed on Jul. 5, 2018.

(30) Foreign Application Priority Data

Sep. 11, 2017 (CN) .......................... 201710814496.X

(51) Int. Cl.
*H04L 29/12* (2006.01)
*H04L 45/64* (2022.01)
(Continued)

(52) U.S. Cl.
CPC .............. *H04L 45/64* (2013.01); *H04L 45/02* (2013.01); *H04L 45/38* (2013.01); *H04L 45/42* (2013.01);
(Continued)

(58) Field of Classification Search
None
See application file for complete search history.

(56) References Cited

U.S. PATENT DOCUMENTS

2010/0274924 A1\* 10/2010 Allan ................ H04L 29/12839
709/245
2011/0002342 A1\* 1/2011 Zheng ................ H04L 63/0892
370/401

(Continued)

FOREIGN PATENT DOCUMENTS

CN 102088391 A 6/2011
CN 104486103 A 4/2015
(Continued)

OTHER PUBLICATIONS

Feng Weiwei, et al.,"Feature of NFV Virtualized NE and its Difference and Similarity with Traditional NE," Guangzhou Research Institute of China Telecom Co., Ltd., Jun. 22, 2017, 8 pages.
(Continued)

*Primary Examiner* — Ajit Patel
(74) *Attorney, Agent, or Firm* — Conley Rose, P.C.

(57) ABSTRACT

A data transmission method includes: receiving, by the PNF SDN controller, a first packet and an access loop identifier that are sent by a first network device; generating, by the PNF SDN controller, a second packet based on the access loop identifier and the first packet; and sending, by the PNF SDN controller, the second packet to the virtualized network function software-defined networking VNF SDN controller, so that the VNF SDN controller sends the second packet to a second network device, where the second packet is used to request the second network device to assign an IP address or IP address prefix to user equipment.

20 Claims, 11 Drawing Sheets

(51) Int. Cl.
*H04L 45/02* (2022.01)
*H04L 45/00* (2022.01)
*H04L 45/42* (2022.01)
*H04L 45/745* (2022.01)
*H04L 49/00* (2022.01)
*H04L 61/103* (2022.01)
*H04L 61/5007* (2022.01)
*H04L 101/622* (2022.01)

(52) U.S. Cl.
CPC ............ *H04L 45/745* (2013.01); *H04L 49/70* (2013.01); *H04L 61/103* (2013.01); *H04L 61/2007* (2013.01); *H04L 61/6022* (2013.01)

(56) References Cited

U.S. PATENT DOCUMENTS

| | | | | |
|---|---|---|---|---|
| 2012/0106468 | A1* | 5/2012 | Engstrom | H04L 61/304 370/329 |
| 2012/0236864 | A1 | 9/2012 | Zheng et al. | |
| 2013/0230045 | A1* | 9/2013 | Xu | H04L 45/68 370/389 |
| 2016/0173338 | A1* | 6/2016 | Wolting | H04L 67/1097 709/223 |
| 2017/0005980 | A1* | 1/2017 | Zheng | H04L 61/203 |
| 2017/0104609 | A1 | 4/2017 | McNamee et al. | |
| 2017/0180213 | A1 | 6/2017 | Li et al. | |
| 2018/0131578 | A1* | 5/2018 | Cui | H04L 49/70 |
| 2018/0316779 | A1* | 11/2018 | Dowlatkhah | H04L 41/5051 |
| 2019/0173779 | A1* | 6/2019 | Gruner | H04L 45/745 |
| 2020/0112538 | A1 | 4/2020 | Zheng | |

FOREIGN PATENT DOCUMENTS

| | | |
|---|---|---|
| CN | 104917849 A | 9/2015 |
| CN | 105391568 A | 3/2016 |
| CN | 105791175 A | 7/2016 |
| CN | 107040441 A | 8/2017 |
| EP | 1909452 A1 | 4/2008 |
| EP | 2765748 A1 | 8/2014 |
| WO | 2016032467 A1 | 3/2016 |
| WO | 2017101970 A1 | 6/2017 |
| WO | 2017131285 A1 | 8/2017 |

OTHER PUBLICATIONS

T. Narten, et al, "Neighbor Discovery for IP version 6 (IPv6)," RFC 4861, Sep. 2007, 97 pages.
S. Thomson et al, "IPv6 Stateless Address Autoconfiguration," RFC 4862, Sep. 2007, 30 pages.
Wen, H., et al., "Port Identifier option for RS/RA messages in IPv6 access network," draft-wen-ipv6-rsra-opt-pid-OI.txt , Jun. 23, 2006, XP015047326, 12 pages.
Patrick, M., et al., "DHCP Relay Agent Information Option," RFC 3046, Jan. 1, 2001, XP015008829, 16 pages.
Verizon Network Infrastructure Planning, "SDN-NFV Reference Architecture," Feb. 2016, XP055695763, 220 pages.
WT-384, "Cloud Central Office Reference Architectural Framework," Revision: 09, Revision Date: Aug. 2017, 128 pages.

* cited by examiner

DATA TRANSMISSION METHOD, PNF SDN CONTROLLER, VNF SDN CONTROLLER, AND DATA TRANSMISSION SYSTEM

CROSS-REFERENCE TO RELATED APPLICATIONS

This is a continuation of Int'l Patent App. No. PCT/CN2018/094709 filed on Jul. 5, 2018, which claims priority to Chinese Patent App. No. 201710814496.X filed on Sep. 11, 2017, which are incorporated by reference.

TECHNICAL FIELD

This disclosure relates to a data transmission method, a PNF SDN controller, a VNF SDN controller, and a data transmission system.

BACKGROUND

Network devices in a system accessed by a user may include user equipment, an access device, a switch, and an Internet Protocol (IP) edge device. An example in which a Dynamic Host Configuration Protocol (DHCP) message/router solicitation (RS) message is processed and transmitted is used.

After receiving a first DHCP/RS packet sent by the user equipment, the access device generates an access loop identifier, adds the access loop identifier to the first DHCP/RS packet to generate a second DHCP/RS packet, and forwards the second DHCP/RS packet to the switch to send the second DHCP/RS packet to a DHCP server by using the switch and the IP edge device, so as to request the DHCP server to assign an IP address or IP address prefix to the user equipment. The DHCP server assigns the IP address or IP address prefix to the user equipment, and sends, based on the access loop identifier, a DHCP/RS response packet carrying the IP address or IP address prefix to the user equipment.

However, for different operators, access loop identifiers corresponding to the user equipment have different formats. Therefore, the network devices each need to be customized for the operators, resulting in relatively high complexity of the network devices.

SUMMARY

This disclosure relates to a data transmission method, a PNF SDN controller, a VNF SDN controller, and a data transmission system, so as to reduce complexity of a network device.

According to a first aspect, an embodiment provides a data transmission method, where the data transmission method may include: receiving, by a physical network function software-defined networking PNF SDN controller, a first packet and an access loop identifier that are sent by a first network device, where the access loop identifier is used to identify a physical port or logical port through which the first network device receives the first packet and that is of the first network device; generating, by the PNF SDN controller, a second packet based on the access loop identifier and the first packet, where the second packet includes the first packet and the access loop identifier; and sending, by the PNF SDN controller, the second packet to a virtualized network function software-defined networking VNF SDN controller, so that the VNF SDN controller sends the second packet to a second network device, where the second packet is used to request the second network device to assign an internet protocol IP address or IP address prefix to the user equipment.

It can be learned that, in this embodiment, in a procedure of processing and transmitting the first packet, after receiving the first packet, the first network device as an access device does not need to process the first packet and the access loop identifier, but needs to send the first packet and the access loop identifier to the PNF SDN controller. The PNF SDN controller processes the first packet and the access loop identifier to generate the second packet, and sends the second packet to the VNF SDN controller, so that the VNF SDN controller sends the second packet to the second network device, such as a DHCP server, and the DHCP server assigns the IP address or IP address prefix to the user equipment. Therefore, complexity of the access device is reduced. In addition, the PNF SDN controller may directly send the second packet to the VNF SDN controller, so that the PNF SDN controller interacts with the VNF SDN controller and does not need to forward the second packet to the VNF SDN controller by using the access device and the third network device as an IP edge device, and data transmission efficiency is improved.

In a possible implementation, after the sending, by the PNF SDN controller, the second packet to the VNF SDN controller, the method may further include: receiving, by the PNF SDN controller, a response packet that corresponds to the second packet and that is sent by the VNF SDN controller, where the response packet that corresponds to the second packet includes the IP address or IP address prefix assigned to the user equipment, and the access loop identifier; and sending, by the PNF SDN controller the IP address or IP address prefix assigned by the second network device to the user equipment, and the access loop identifier to the first network device.

It can be learned that, the PNF SDN controller interacts with the VNF SDN controller and does not need to forward the second packet to the VNF SDN controller by using the access device and the IP edge device, and data transmission efficiency is improved.

In a possible implementation, the sending, by the PNF SDN controller, the second packet to a VNF SDN controller may include: sending, by the PNF SDN controller, the second packet directly to the VNF SDN controller through an interconnection interface between the PNF SDN controller and the VNF SDN controller, so that the PNF SDN controller directly interacts with the VNF SDN controller and does not need to forward the second packet to the VNF SDN controller by using the access device and the IP edge device, and data transmission efficiency is improved.

In a possible implementation, the sending, by the PNF SDN controller, the second packet to a VNF SDN controller may include: sending, by the PNF SDN controller, the second packet to the VNF SDN controller by using an upper-level controller.

In a possible implementation, after the receiving, by the PNF SDN controller, a response packet that corresponds to the second packet and that is sent by the VNF SDN controller, the method may further include: generating, by the PNF SDN controller, a table of a mapping between the IP address or IP address prefix and a MAC address of the user equipment based on the response packet that corresponds to the second packet; and sending, by the PNF SDN controller the table of the mapping between the IP address or IP address prefix and the MAC address of the user equipment to the first network device, to prevent MAC address spoofing and IP address spoofing or IP address prefix spoofing, so that security of the network device is improved.

According to a second aspect, an embodiment provides a data transmission method, where the data transmission method may include: receiving, by a virtualized network function software-defined networking VNF SDN controller, a second packet sent by a PNF SDN controller, where the second packet is generated by the PNF SDN controller based on an access loop identifier and a first packet; and sending, by the VNF SDN controller, the second packet to a second network device, where the second packet is used to request the second network device to assign an IP address or IP address prefix to user equipment, and the access loop identifier is used to identify a physical port or logical port through which a first network device receives the first packet and that is of the first network device.

It can be learned that, in this embodiment, the VNF SDN controller may directly receive the second packet sent by the PNF SDN controller, so that the PNF SDN controller directly interacts with the VNF SDN controller and does not need to forward the second packet to the VNF SDN controller by using an access device and an IP edge device, and data transmission efficiency is improved.

In a possible implementation, after the sending, by the VNF SDN controller, the second packet to a second network device, the method may further include: receiving, by the VNF SDN controller, a response packet that corresponds to the second packet and that is sent by the second network device, where the response packet that corresponds to the second packet includes the IP address or IP address prefix assigned by the second network device to the user equipment, and the access loop identifier; and sending, by the VNF SDN controller, the response packet that corresponds to the second packet to the PNF SDN controller.

In a possible implementation, the receiving, by a VNF SDN controller, a second packet sent by a PNF SDN controller may include: receiving, by the VNF SDN controller through an interconnection interface between the VNF SDN controller and the PNF SDN controller, the second packet sent by the PNF SDN controller, so that the PNF SDN controller directly interacts with the VNF SDN controller and does not need to forward the second packet to the VNF SDN controller by using the access device and the IP edge device, and data transmission efficiency is improved.

In a possible implementation, the receiving, by a VNF SDN controller, a second packet sent by a PNF SDN controller may include: receiving, by the VNF SDN controller by using an upper-level controller, the second packet sent by the PNF SDN controller.

In a possible implementation, after the receiving, by the VNF SDN controller, a response packet that corresponds to the second packet and that is sent by the second network device, the method may further include: generating, by the VNF SDN controller, a table of a mapping between the IP address or IP address prefix and a MAC address of the user equipment based on the response packet that corresponds to the second packet; and sending, by the VNF SDN controller, the table of the mapping between the IP address or IP address prefix and the MAC address of the user equipment to a third network device, to prevent MAC address spoofing and IP address spoofing or IP address prefix spoofing, so that security of the network device is improved.

In a possible implementation, before the sending, by the VNF SDN controller, the second packet to a second network device, the method may further include: obtaining, by the VNF SDN controller, the access loop identifier from the second packet; sending, by the VNF SDN controller, an authentication request packet to a fourth network device, where the authentication request packet includes the access loop identifier; and receiving, by the VNF SDN controller, an authorization response packet sent by the fourth network device, to complete authentication and authorization of a user.

According to a third aspect, an embodiment provides a physical network function software-defined networking PNF SDN controller, where the PNF SDN controller may include: a receiving unit configured to receive a first packet and an access loop identifier that are sent by a first network device, where the access loop identifier is used to identify a physical port or logical port through which the first network device receives the first packet and that is of the first network device; a generation unit configured to generate a second packet based on the access loop identifier and the first packet, where the second packet includes the first packet and the access loop identifier; and a sending unit configured to send the second packet to a virtualized network function software-defined networking VNF SDN controller, so that the VNF SDN controller sends the second packet to a second network device, where the second packet is used to request the second network device to assign an IP address or IP address prefix to the user equipment.

In a possible implementation, the receiving unit is further configured to receive a response packet that corresponds to the second packet and that is sent by the VNF SDN controller, where the response packet that corresponds to the second packet includes the IP address or IP address prefix assigned by the second network device to the user equipment, and the access loop identifier.

The sending unit is further configured to send, to the first network device, the IP address or IP address prefix assigned by the second network device to the user equipment, and the access loop identifier.

In a possible implementation, the sending unit is further configured to send the second packet to the VNF SDN controller through an interconnection interface between the PNF SDN controller and the VNF SDN controller.

In a possible implementation, the sending unit is further configured to send the second packet to the VNF SDN controller by using an upper-level controller.

In a possible implementation, the generation unit is further configured to generate a table of a mapping between the IP address or IP address prefix and a MAC address of the user equipment based on the response packet that corresponds to the second packet.

The sending unit is further configured to send the table of the mapping between the IP address or IP address prefix and the MAC address of the user equipment to the first network device.

According to a fourth aspect, an embodiment further provides a virtualized network function software-defined networking VNF SDN controller, where the VNF SDN controller may include: a receiving unit configured to receive a second packet sent by a PNF SDN controller, where the second packet is generated by the PNF SDN controller based on an access loop identifier and a first packet; and a sending unit configured to send the second packet to a second network device, where the second packet is used to request the second network device to assign an IP address or IP address prefix to user equipment, and the access loop identifier is used to identify a physical port or logical port through which a first network device receives the first packet and that is of the first network device.

In a possible implementation, the receiving unit is further configured to receive a response packet that corresponds to the second packet and that is sent by the second network device, where the response packet that corresponds to the second packet includes the IP address or IP address prefix assigned to the user equipment, and the access loop identifier.

The sending unit is further configured to send the response packet that corresponds to the second packet to the PNF SDN controller.

In a possible implementation, the receiving unit is further configured to receive, through an interconnection interface between the VNF SDN controller and the PNF SDN controller, the second packet sent by the PNF SDN controller.

In a possible implementation, the receiving unit is further configured to receive, by using an upper-level controller, the second packet sent by the PNF SDN controller.

In a possible implementation, the VNF SDN controller may further include a generation unit.

The generation unit is configured to generate a table of a mapping between the IP address or IP address prefix and a MAC address of the user equipment based on the response packet that corresponds to the second packet.

The sending unit is further configured to send the table of the mapping between the IP address or IP address prefix and the MAC address of the user equipment to a third network device.

In a possible implementation, the VNF SDN controller may further include: an obtaining unit configured to obtain the access loop identifier from the second packet.

The sending unit is further configured to send an authentication request packet to a fourth network device, where the authentication request packet includes the access loop identifier.

The receiving unit is further configured to receive an authorization response packet sent by the fourth network device.

According to a fifth aspect, an embodiment further provides a physical network function software-defined networking PNF SDN controller, where the PNF SDN controller may include: a communications interface configured to: receive a first packet and an access loop identifier that are sent by a first network device, and send a generated second packet to a VNF SDN controller, where the access loop identifier is used to identify a physical port or logical port through which the first network device receives the first packet and that is of the first network device.

Optionally, the communications interface may be further configured to: receive a response packet that corresponds to the second packet and that is sent by the VNF SDN controller, where the response packet that corresponds to the second packet includes an IP address or IP address prefix assigned to user equipment, and the access loop identifier; send the IP address or IP address prefix assigned to the user equipment, and the access loop identifier to the first network device; and send a table of a mapping between the IP address or IP address prefix and a MAC address of the user equipment to the first network device.

Optionally, the PNF SDN controller may further include a memory configured to store a program.

The processor is configured to: execute the program stored in the memory, and when the program is executed, generate the second packet based on the access loop identifier and the first packet, where the second packet includes the first packet and the access loop identifier; and process the response packet that corresponds to the second packet, and separate the access loop identifier from the response packet that corresponds to the second packet.

Optionally, the processor is further configured to generate the table of the mapping between the IP address or IP address prefix and the MAC address of the user equipment based on the response packet that corresponds to the second packet.

According to a sixth aspect, an embodiment further provides a virtualized network function software-defined networking VNF SDN controller, where the VNF SDN controller may include: a communications interface configured to: receive a second packet sent by a physical network function software-defined networking PNF SDN controller, where the second packet is generated by the PNF SDN controller based on an access loop identifier and a first packet; and send the second packet to a second network device, where the second packet is used to request the second network device to assign an IP address or IP address prefix to user equipment, and the access loop identifier is used to identify a physical port or logical port through which the first network device receives the first packet and that is of the first network device.

Optionally, the communications interface may be further configured to: receive a response packet that corresponds to the second packet and that is sent by the second network device, where the response packet that corresponds to the second packet includes the IP address or IP address prefix assigned to the user equipment, and the access loop identifier; send the response packet that corresponds to the second packet to the PNF SDN controller; receive a MAC address of the user equipment sent by the PNF SDN controller; send a table of a mapping between the IP address or IP address prefix and the MAC address of the user equipment to a third network device; obtain the access loop identifier from the second packet; send an authentication request packet to a fourth network device, where the authentication request packet includes the access loop identifier; and receive an authorization response packet sent by the fourth network device.

Optionally, the VNF SDN controller may further include a memory configured to store a program.

Optionally, the VNF SDN controller may further include a processor configured to: execute the program stored in the memory, and when the program is executed, generate the table of the mapping between the IP address or IP address prefix and the MAC address of the user equipment based on the response packet that corresponds to the second packet.

According to a seventh aspect, an embodiment further provides a data transmission system, where the system includes: the PNF SDN controller according to the third aspect or any possible implementation of the third aspect and the VNF SDN controller according to the fourth aspect or any possible implementation of the fourth aspect.

According to an eighth aspect, another aspect provides a computer readable storage medium, where the computer readable storage medium stores an instruction, and when the instruction is run on a computer, the computer is enabled to perform the method according to any one of the foregoing aspects.

According to the data transmission method, the PNF SDN controller, the VNF SDN controller, and the data transmission system provided in the embodiments, the PNF SDN controller receives a first packet and an access loop identifier that are sent by an access device, generates a second packet based on the access loop identifier and the first packet, and sends the second packet to the VNF SDN controller. The VNF SDN controller receives the second packet sent by the PNF SDN controller, and sends the second packet to a DHCP server, to request the DHCP server to assign an IP address or IP address prefix to user equipment. It can be learned that, according to the data transmission method, the PNF SDN controller, the VNF SDN controller, and the data transmission system provided in the embodiments, in a procedure of processing and transmitting the first packet, after receiving the first packet, the access device does not need to process the first packet and the access loop identifier, but needs to send the first packet and the access loop identifier to the PNF SDN controller. The PNF SDN controller processes the first packet and the access loop identifier to generate the second packet, and sends the second packet to the VNF SDN controller, so that the VNF SDN controller sends the second packet to a network server, and the network server assigns an IP address or IP address prefix to the user equipment. Therefore, complexity of the access device is reduced. In addition, the PNF SDN controller may directly send the second packet to the VNF SDN controller when sending to the VNF SDN controller, so that the PNF SDN controller interacts with the VNF SDN controller and does not need to forward the second packet to the VNF SDN controller by using the access device and an IP edge device, and data transmission efficiency is improved.

DESCRIPTION OF EMBODIMENTS

Figure 1:
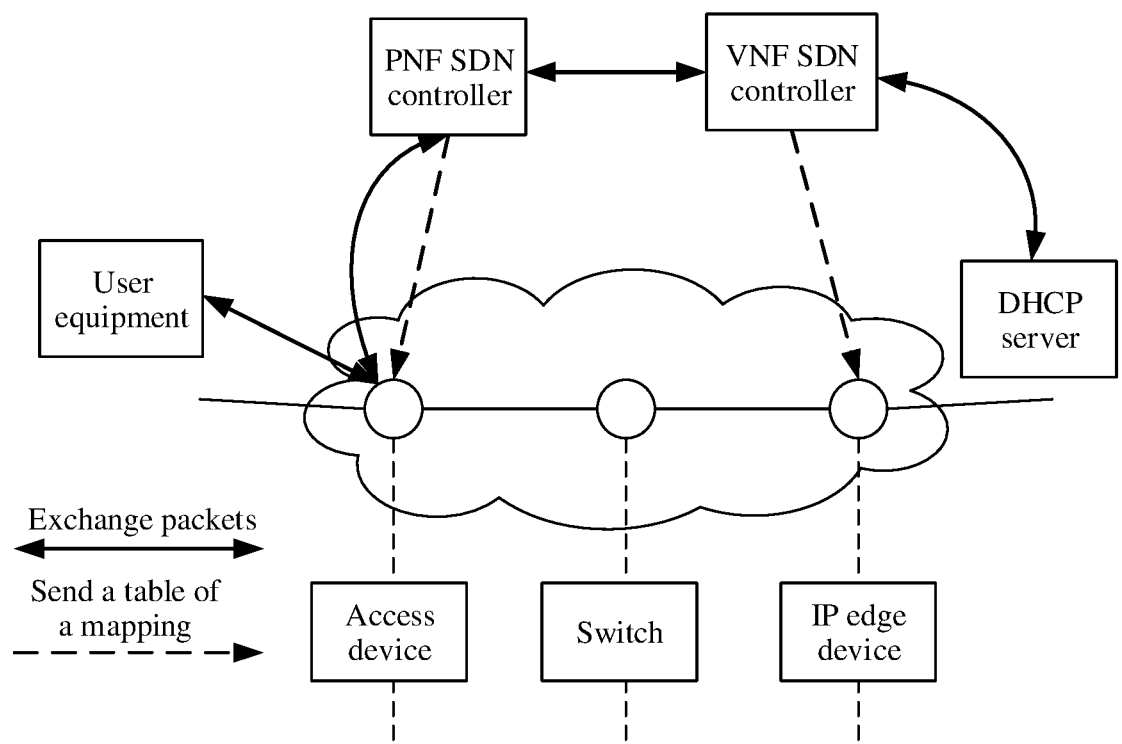
FIG. 1 is an architectural diagram of a system.

In a scenario in which user equipment accesses a network, a network system shown in FIG. 1 may be a digital subscriber line (DSL) access system, an Ethernet access system, or a passive optical network (PON) access system. A scenario in which the user equipment requests an IP address is used as an example. An access network system mainly includes devices such as the user equipment, an access device, an IP edge device, and a DHCP server. The user equipment communicates with each of the IP edge device and the DHCP server by using the access device. There may be one or more relay devices between the access device and the DHCP server. The access device communicates with the DHCP server by using the one or more relay devices, or the access device may directly communicate with the DHCP server without the relay device. The user equipment may be a mobile phone (or cellular phone) or a computer having a mobile terminal. For example, the user equipment may be a portable, pocket-sized, handheld, computer built-in, or vehicle-mounted mobile apparatus. The user equipment may be also referred to as a terminal device, a mobile station (MS), or a terminal. The user equipment may further be a subscriber unit, a cellular phone, a smartphone, a wireless data card, a personal digital assistant (PDA), a tablet computer, a wireless modem, a handheld device, a laptop computer, a cordless phone or a wireless local loop (WLL) station, a machine type communications (MTC) terminal, or the like. The access device is mainly used by the user equipment to access the network, to enable the user equipment to access a remote network resource. For example, the access device may be a digital subscriber line access multiplexer (DSLAM), an optical network unit (ONU), an optical line termination (OLT), or the like. The IP edge device is mainly used for data packet transmission for the access device and a network device, and may be a device such as a switch or a router, installed on a network edge. For example, the IP edge device may be a broadband network gateway (BNG), a broadband remote access server (BRAS), or the like. The DHCP server is mainly responsible for services such as management and allocation of an IP address or IP address prefix.

An example in which the user equipment requests an IP address is used. The user equipment sends a DHCP request packet to the DHCP server, where the DHCP request packet is used to request the DHCP server to assign an IP address or IP address prefix to the user equipment. The access device receives the DHCP request packet sent by the user equipment, and sends the DHCP request packet and an access loop identifier that corresponds to the DHCP request packet to the DHCP server. The access loop identifier, which is also referred to as an access line identifier, can uniquely identify the access device and a physical port or logical port through which a message is received and that is on the access device. The DHCP server receives the DHCP request packet and the access loop identifier, and sends the IP address or IP address prefix assigned to the user equipment, and the access loop identifier to the access device. The access device receives the access loop identifier and the IP address or IP address prefix, and sends, to the user equipment based on the access loop identifier, the IP address or IP address prefix assigned to the user equipment. In this process, because the DHCP request packet needs to be sent together with the access loop identifier to the DHCP server, each network device on a transmission path of the DHCP request packet needs to support a DHCP processing function and an access loop identifier processing function. For example, network devices such as a DSLAM, a router, a BNG, and a switch, on the transmission path of the DHCP packet each need to have the DHCP packet processing function and the access loop identifier processing function. However, for different operators, access loop identifiers corresponding to the operators have different formats and content. Therefore, the network devices each need to be customized for the operators, resulting in relatively high complexity of the network devices and frequent version upgrades.

To reduce complexity of the network devices and prevent the network devices from becoming more complex due to service processing, a software-defined networking (SDN) technology has been widely applied. The SDN technology enables a network device to implement simple forwarding and processing of a service, to simplify the network device. Complex processing of a service is implemented by a controller. In this way, forwarding can be separated from control. Meanwhile, network device virtualization also becomes available with development of virtualized network function (VNF) technologies. FIG. 1 provides a schematic diagram of a scenario in which these technologies are applied. The scenario may be a schematic architectural diagram of an access network system. The network access system in FIG. 1 includes a physical network function (PNF) SDN controller, a VNF SDN controller, a user equipment, an access device managed and controlled by the PNF SDN controller, an IP network edge device managed and controlled by the VNF SDN, and a DHCP server configured to provide an IP address or IP address prefix. Optionally, the access network system in FIG. 1 may also include a switch that connects the access device and the IP edge device.

In a scenario in which the user equipment sends a DHCP request packet, when the access device receives the DHCP request packet sent by the user equipment, the access device forwards the DHCP request packet and an access loop identifier that corresponds to the DHCP request packet to the PNF SDN controller. The PNF SDN controller receives the DHCP request packet and the access loop identifier that are sent by the access device, and the PNF SDN controller generates a second packet based on the DHCP request packet and the access loop identifier. For example, the PNF SDN controller receives the access loop identifier and the DHCP request packet, and adds the access loop identifier to a field options in the DHCP request packet, to generate the second packet. A function that is provided by the access device and used to add the access loop identifier to the first DHCP packet is integrated into the PNF SDN controller. The PNF SDN controller sends the second packet to the access device. The access device sends the second packet to a next hop, for example, a network device A (not shown in the figure), on a DHCP service path. If the network device A is controlled and managed by the VNF SDN controller, the network device A sends the second packet to the VNF SDN controller. The VNF SDN controller processes the second packet and generates a new packet. For example, the new packet is a third packet. A process in which the VNF SDN controller processes the second packet may be adding content to the packet and performing re-encapsulation, or may be parsing the packet and separating a field. For example, the VNF SDN controller adds an identifier that corresponds to a device to the second packet. The process in which the VNF SDN controller processes the second packet is determined based on a service type. Alternatively, the VNF SDN controller may only forward the received packet without performing any processing. The foregoing processing process is not limited in this disclosure. The VNF SDN controller sends the third packet to the IP edge device. The IP edge device sends the third packet to a next hop, for example, a network device B, of the network device A based on the DHCP service path. It can be learned that, in a process in which the DHCP request packet sent by the user equipment is transmitted on the service path, each network node on the DHCP service path needs to forward a received DHCP request packet to the PNF SDN controller or the VNF SDN controller, and the PNF SDN controller or the VNF SDN controller sends a packet to the network device after processing the DHCP request packet, and the network device continues to perform transmission based on the service path of the packet. This increases packet transmission complexity and network load, and is adverse to network node simplification.

Optionally, the PNF SDN controller may alternatively send the access loop identifier and a first packet to the VNF SDN controller separately. The VNF SDN controller may encapsulate the access loop identifier and the first packet into a same packet and send the packet to the DHCP server, or may send the access loop identifier and the first packet to the DHCP server separately.

To simplify a packet transmission procedure, and reduce network device complexity and network load, this disclosure provides a data transmission method. FIG. 1 is a schematic diagram of a scenario according to an embodiment. Specifically, as shown FIG. 1, a communications system may include user equipment, an access device, an IP edge device, a DHCP server, a PNF SDN controller, and a VNF SDN controller. The user equipment may communicate with the DHCP server by using the access device, or the user equipment may communicate with the DHCP server by using the access device and a relay device. The PNF SDN controller may communicate with each physical network device on a DHCP path, while the VNF SDN controller may communicate with each virtual network device on the DHCP path. The PNF SDN controller communicates with the VNF SDN controller. The access device may be referred to as a first network device, and the DHCP server may be referred to as a second network device. The method includes the following steps: The user equipment sends a first packet to the first network device. The first network device receives the first packet, and sends the first packet and an access loop identifier that corresponds to the first packet to the PNF SDN controller. The access loop identifier is used to identify a physical port or logical port through which the first network device receives the first packet and that is of the first network device. The PNF SDN controller receives the first packet and the access loop identifier that are sent by the first network device, and generates a second packet based on the access loop identifier and the first packet. The PNF SDN controller sends the second packet to the VNF SDN controller, where the second packet is used to request the second network device to assign an IP address or IP address prefix to the user equipment. It can be learned that, according to the data transmission method provided in this embodiment, in a procedure of processing and transmitting the first packet, when receiving the first packet, the first network device does not process the first packet and the access loop identifier, but sends the first packet and the access loop identifier to the PNF SDN controller. The PNF SDN controller processes the first packet and the access loop identifier to generate the second packet. The PNF SDN controller sends the second packet to the VNF SDN controller, and the VNF SDN controller forwards the second packet to the second network device. The second network device sends the IP address or IP address prefix assigned to the user equipment, and the access loop identifier to the VNF SDN controller in a form of a response packet that corresponds to the second packet. The VNF SDN controller sends the obtained response packet that corresponds to the second packet to the PNF SDN controller. The PNF SDN controller parses the response packet that corresponds to the second packet, and sends the access loop identifier and the assigned IP address or IP address prefix to the access device. In the foregoing process, a network device, for example, the access device, does not need to process the access loop identifier. In addition, the PNF SDN controller may send the generated second packet to the VNF SDN controller, so that the PNF SDN controller can communicate with the VNF SDN controller, and the second packet does not need to be transmitted on a service path between the access device and the IP edge device, thereby simplifying a procedure, reducing network load, and reducing complexity of the access device.

Optionally, that the PNF SDN controller sends the second packet to the VNF SDN controller includes: sending, by the PNF SDN controller, the second packet to the VNF SDN controller through an interconnection interface between the PNF SDN controller and the VNF SDN controller, or sending, by the PNF SDN controller, the second packet to the VNF SDN controller by using an upper-level controller.

In a possible implementation, configuration may be performed to enable direct communication between the PNF SDN controller and the VNF SDN controller. For example, the interconnection interface is configured, so that the PNF SDN controller and the VNF SDN controller support a same network interworking protocol, and the PNF SDN controller and the VNF SDN controller can transmit packets to each other through the interconnection interface. For example, configuration can be performed to enable direct transmission of a DHCP packet between the PNF SDN controller and the VNF SDN controller. Communication and information exchange between the PNF SDN controller and the VNF SDN controller may be implemented by extending a private protocol, a border gateway protocol (BGP), a session initiation protocol (SIP), or interior gateway protocol (IGP).

In another possible implementation, the PNF SDN controller and the VNF SDN controller may transmit packets to each other by using an upper-level manager or controller (for example, an orchestrator).

In the second possible implementation, the PNF SDN controller, the VNF SDN controller, and the orchestrator need to be preconfigured, so that the PNF SDN controller, the VNF SDN controller, and the orchestrator can support a same transmission protocol, so as to implement packet transmission between the PNF SDN controller and the VNF SDN controller by using the orchestrator. Therefore, the packet transmission between the PNF SDN controller and the VNF SDN controller is implemented by using the orchestrator.

Figure 2:
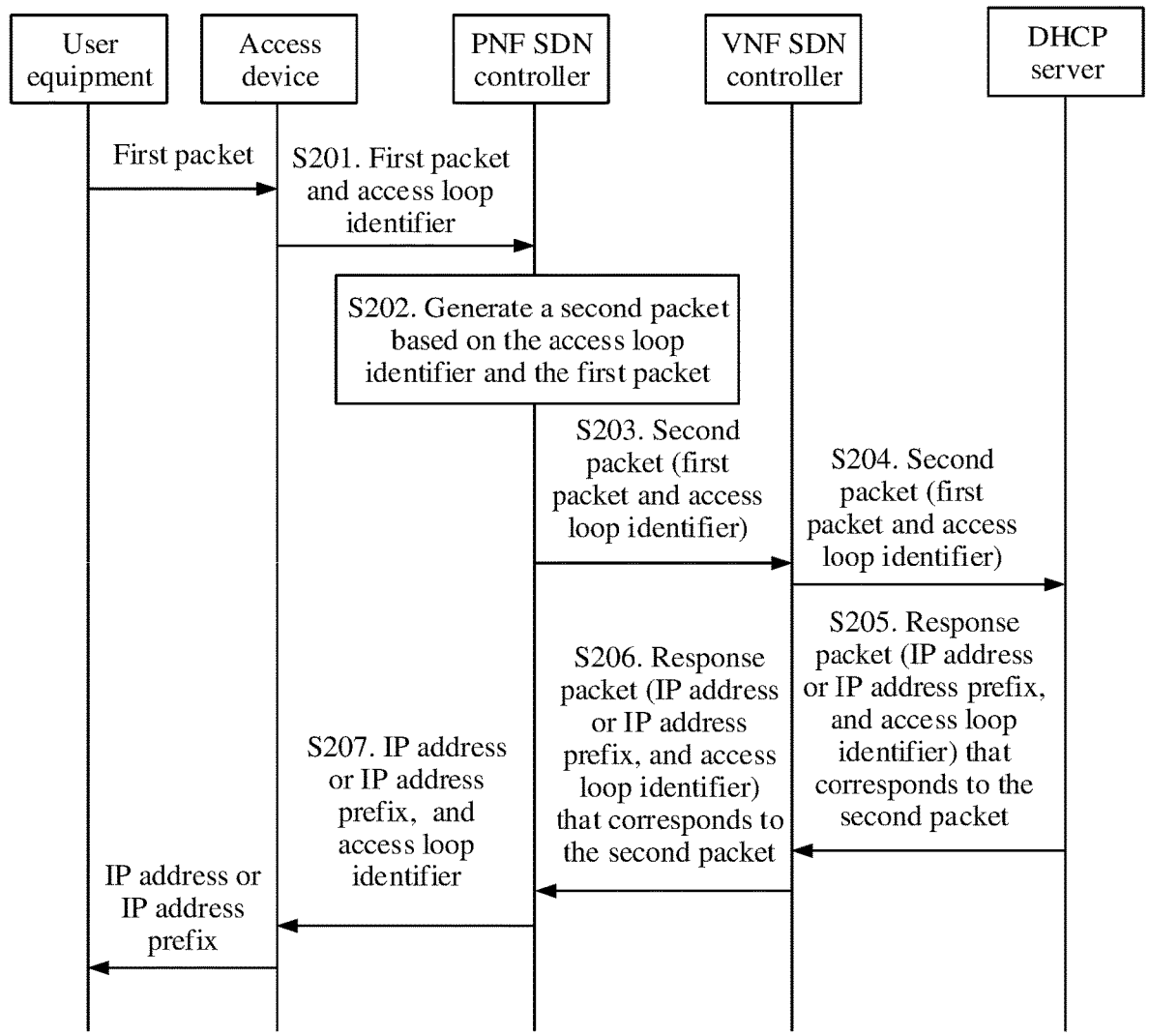
FIG. 2 is a schematic diagram of a data transmission method according to an embodiment.

FIG. 2 is a schematic diagram of a data transmission method according to an embodiment. As shown in FIG. 2, the data transmission method may include:

S201. A PNF SDN controller receives a first packet and an access loop identifier that are sent by an access device, wherein the access loop identifier is used to identify a physical port or logical port through which the access device receives the first packet and that is of the access device.

After receiving the first packet, the access device does not perform service processing on the first packet, but sends the first packet to the PNF SDN controller. The access device also sends the access loop identifier that corresponds to the first packet to the PNF SDN controller.

For example, the first packet may be a DHCP packet or an RS packet. It should be noted that, in this embodiment, the first packet and the access loop identifier are two independent packets. In this embodiment, packet types of the first packet and the access loop identifier that are sent by the access device are specifically related to a communications protocol between a first network device and the PNF SDN controller. For example, the access device may add the first packet and the access loop identifier to any one of the following messages: an OpenFlow message, an access management or control protocol, an Mfc interface channel message, a tunnel message, or metadata of a service function chain (SFC), and send the message to the PNF SDN controller. For example, the access device creates a first OpenFlow message; extends OpenFlow, so that the first OpenFlow message (for example, a packet-in message) carries the corresponding access loop identifier of the access device and the first packet; and sends the OpenFlow message to the PNF SDN controller. Optionally, the first OpenFlow message further carries a media access control (MAC) address of a user-side device that sends the first packet.

In this embodiment, in a process in which user equipment requests an IP address or IP address prefix, the user equipment may first send the first packet to the access device; after receiving the first packet through the physical port, the access device generates the corresponding access loop identifier, and then sends the first packet and the access loop identifier to the PNF SDN controller, so that the PNF SDN controller receives the first packet and the access loop identifier. It can be learned that, after receiving the first packet sent by the user equipment, the access device does not need to process the first packet and the access loop identifier, but needs to send the first packet and the access loop identifier to the PNF SDN controller, thereby reducing complexity of the access device.

It should be noted that, for different access systems, the access loop identifier of the user equipment has different formats. Specifically, in a DSL/Ethernet access system, a format of the access loop identifier of the user equipment is as follows:

When the access device is located on an asynchronous transfer mode (ATM)-based DSL line, the format of the access loop identifier of the user equipment is: Access-Node-Identifier atm slot/port:vpi.vci.

When the access device is located on an Ethernet-based DSL/Ethernet line, the format of the access loop identifier of the user equipment is: Access-Node-Identifier eth slot/port [:vlan-id].

Access-Node-Identifier represents an identifier of the access device (such as a DSLAM); slot/port represents one or a combination of a cabinet number, a rack number, a subrack number, a slot number, a sub-slot number, and a port number on the access device; vpi.vci represents a virtual path identifier and a virtual channel identifier on the DSL line. "[ ]" in the format means optional.

In a PON access system, the access loop identifier that corresponds to the access device includes access loop identifier information of an ONU part and also includes access loop identifier information of an OLT part. A format of the access loop identifier of the user equipment is as follows:

When an ONU is used as the user equipment and is located on an ATM-based DSL line, an access loop identifier that corresponds to the ONU is: Access-Node-Identifier atm slot1/port1/ONUID/slot2/port2:vpi.vci.

When an ONU is used as the user equipment and is located on an Ethernet-based DSL/Ethernet line, an access loop identifier that corresponds to the ONU is: Access-Node-Identifier eth slot1/port1/ONUID/slot2/port2[:vlan-id].

Access-Node-Identifier represents an identifier of an OLT; slot1/port1 represents one or a combination of a cabinet number, a rack number, a subrack number, a slot number, a sub-slot number, and a port number that are on the OLT; slot2/port2 represents one or a combination of a cabinet number, a rack number, a subrack number, a slot number, a sub-slot number, and a port number that are on the ONU; ONUID/slot2/port2:vpi.vci represents the access loop identifier information of the ONU part; Access-Node-Identifier slot1/port1 represents the access loop identifier information of the OLT part.

S202. The PNF SDN controller generates a second packet based on the access loop identifier and the first packet, where the second packet includes the first packet and the access loop identifier.

For example, after receiving the first packet and the access loop identifier, the PNF SDN controller may add the access loop identifier to a field of the first packet, to generate the second packet. Alternatively, the PNF SDN controller obtains the first packet and the access loop identifier to create the second packet, where the second packet carries the access loop identifier, thereby implementing packet control and processing. In this case, the access device only needs to send the first packet and the access loop identifier to the PNF SDN controller. A function of the access device is integrated into the PNF SDN controller, thereby reducing complexity of the access device.

For example, if the first packet is a first DHCP packet, the PNF SDN controller may add the access loop identifier to a field options in the first DHCP packet after receiving the first DHCP packet and the access loop identifier, to generate a second DHCP packet.

S203. The PNF SDN controller sends the second packet to the VNF SDN controller.

The PNF SDN controller sends the second packet to the VNF SDN controller, so that the VNF SDN controller sends the second packet to a DHCP server, where the second packet is used to request the DHCP server to assign an IP address or IP address prefix to the user equipment.

In this embodiment, the PNF SDN controller generates the second packet and may directly send the second packet to the VNF SDN controller. The PNF SDN controller interacts with the VNF SDN controller and does not need to forward the second packet to the VNF SDN controller by using the access device and an IP edge device, so that data transmission efficiency is improved, and a performance requirement for the access device and load of the access device can be reduced. Optionally, there may be two possible implementations in which the PNF SDN controller sends the second packet to the VNF SDN controller, which are specifically as follows:

In a first possible implementation, the PNF SDN controller sends the second packet to the VNF SDN controller through an interconnection interface between the PNF SDN controller and the VNF SDN controller.

In a second possible implementation, the PNF SDN controller sends the second packet to the VNF SDN controller by using an upper-level controller. For example, the upper-level controller may be an orchestrator, and the orchestrator is connected to and communicates with each of the PNF SDN controller and the VNF SDN controller. The PNF SDN controller sends the second packet to the orchestrator, and the orchestrator forwards the second packet to the VNF SDN controller.

It should be noted that, in this embodiment, for details about how the PNF SDN controller sends the second packet to the VNF SDN controller through the interconnection interface or by using the orchestrator, refer to the foregoing two possible implementations in which the PNF SDN controller and the VNF SDN controller transmit packets to each other. Details are not described in this disclosure. In the two implementations, the PNF SDN controller interacts and communicates with the VNF SDN controller, thereby improving data transmission efficiency.

It should be noted that, in this embodiment, after S203 in which the PNF SDN controller sends the second packet to the VNF SDN controller, optionally, the VNF SDN controller may receive the second packet sent by the PNF SDN controller in two possible implementations.

In a first possible implementation, the VNF SDN controller receives, through the interconnection interface between the VNF SDN controller and the PNF SDN controller, the second packet sent by the PNF SDN controller.

In a second possible implementation, the VNF SDN controller receives, by using the upper-level controller, the second packet sent by the PNF SDN controller.

It should be noted that, in this embodiment, for details about how the VNF SDN controller receives, through the interconnection interface or by using the orchestrator, the second packet sent by the PNF SDN controller, refer to the foregoing two possible implementations in which the PNF SDN controller and the VNF SDN controller transmit packets to each other. Details are not described in this disclosure. In the two implementations, the PNF SDN controller interacts with the VNF SDN controller, thereby improving data transmission efficiency.

It should be noted that, the two possible implementations in which the VNF SDN controller receives the second packet sent by the PNF SDN controller are similar to the two possible implementations in which the PNF SDN controller sends the second packet to the VNF SDN controller. Details are not described in this disclosure. After receiving the second packet sent by the PNF SDN controller, the VNF SDN controller may perform the following S204.

S204. The VNF SDN controller sends the second packet to the DHCP server. The VNF SDN controller sends the second packet to the DHCP server, so that the DHCP server assigns the IP address or IP address prefix to the user equipment after receiving the second packet, to complete a request process of the first packet, namely, a process of requesting to assign the IP address or IP address prefix to the user equipment.

It can be learned that, according to the data transmission method provided, in a procedure of processing and transmitting the first packet, after receiving the first packet, the access device does not need to process the first packet and the access loop identifier, but needs to send the first packet and the access loop identifier to the PNF SDN controller. The PNF SDN controller processes the first packet and the access loop identifier to generate the second packet, and sends the second packet to the VNF SDN controller, so that the VNF SDN controller sends the second packet to the DHCP server, and the DHCP server assigns the IP address or IP address prefix to the user equipment. Therefore, complexity of the access device is reduced. Further, after assigning the IP address or IP address prefix to the user equipment, the DHCP server may add the assigned IP address or IP address prefix to a response packet that corresponds to the second packet, and send the response packet to the VNF SDN controller. This process is a response process of the second packet. For details, refer to S205 to S207.

S205. The VNF SDN controller receives the response packet that corresponds to the second packet and that is sent by the DHCP server.

After receiving the second packet from the VNF SDN controller, the DHCP server sends the response packet to the VNF SDN controller. The response packet that corresponds to the second packet includes the IP address or IP address prefix assigned by the DHCP server to the user equipment, and the access loop identifier.

S206. The VNF SDN controller sends the response packet to the PNF SDN controller.

It should be noted that, in this embodiment, for details about how the VNF SDN controller sends the response packet that corresponds to the second packet to the PNF SDN controller, refer to the foregoing two possible implementations in which the PNF SDN controller and the VNF SDN controller transmit packets to each other. Details are not described in this disclosure.

S207. The PNF SDN controller sends, to the access device, the IP address or IP address prefix assigned by the DHCP server to the user equipment, and the access loop identifier.

Specifically, the PNF SDN controller receives the response packet, and obtains a third packet by separating the access loop identifier. The third packet includes the IP address or IP address prefix assigned by the DHCP server to the user equipment, and the access loop identifier. A type of the third packet is not limited, and the third packet may be a DHCP packet or may be not a DHCP packet.

For example, the PNF SDN controller receives and parses the response packet, separates the access loop identifier from the response packet, and sends the IP address or IP address prefix assigned to the user equipment, and the access loop identifier to the access device by using the third packet. For example, the third packet is an OpenFlow message. The PNF SDN controller sends the IP address or IP address prefix assigned to the user equipment, and the access loop identifier to the access device by using the OpenFlow message. According to the data transmission method provided, after receiving the first packet and the access loop identifier that are sent by the access device, the PNF SDN controller generates the second packet based on the access loop identifier and the first packet, and sends the second packet to the VNF SDN controller. After receiving the second packet sent by the PNF SDN controller, the VNF SDN controller sends the second packet to the DHCP server to request the DHCP server to assign the IP address or IP address prefix to the user equipment, so as to complete processing and transmission of the first packet. It can be learned that, according to the data transmission method provided, in the process of processing and transmitting the first packet, after receiving the first packet, the access device does not need to process the first packet and the access loop identifier, but needs to send the first packet and the access loop identifier to the PNF SDN controller. The PNF SDN controller processes the first packet and the access loop identifier to generate the second packet, and sends the second packet to the VNF SDN controller, so that the VNF SDN controller sends the second packet to a network server, and the network server assigns an IP address or IP address prefix to the user equipment. Therefore, complexity of the access device is reduced. In addition, the PNF SDN controller may directly send the second packet to the VNF SDN controller when sending to VNF, so that the PNF SDN controller interacts with the VNF SDN controller and does not need to forward the second packet to the VNF SDN controller by using the access device and the IP edge device, and data transmission efficiency is improved.

Figure 3A:
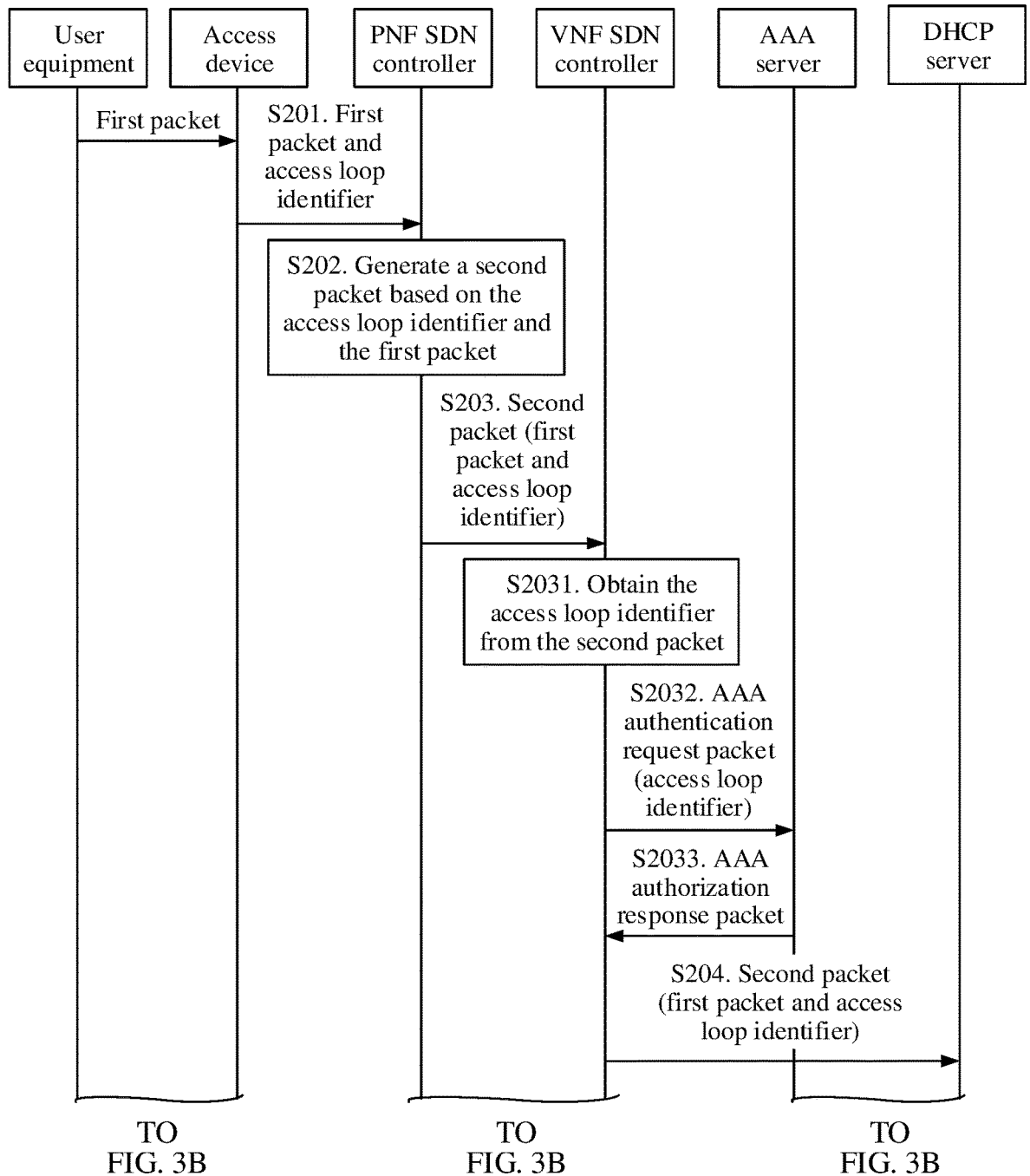
FIG. 3A and FIG. 3B are a schematic diagram of another data transmission method according to an embodiment.
Figure 3B:
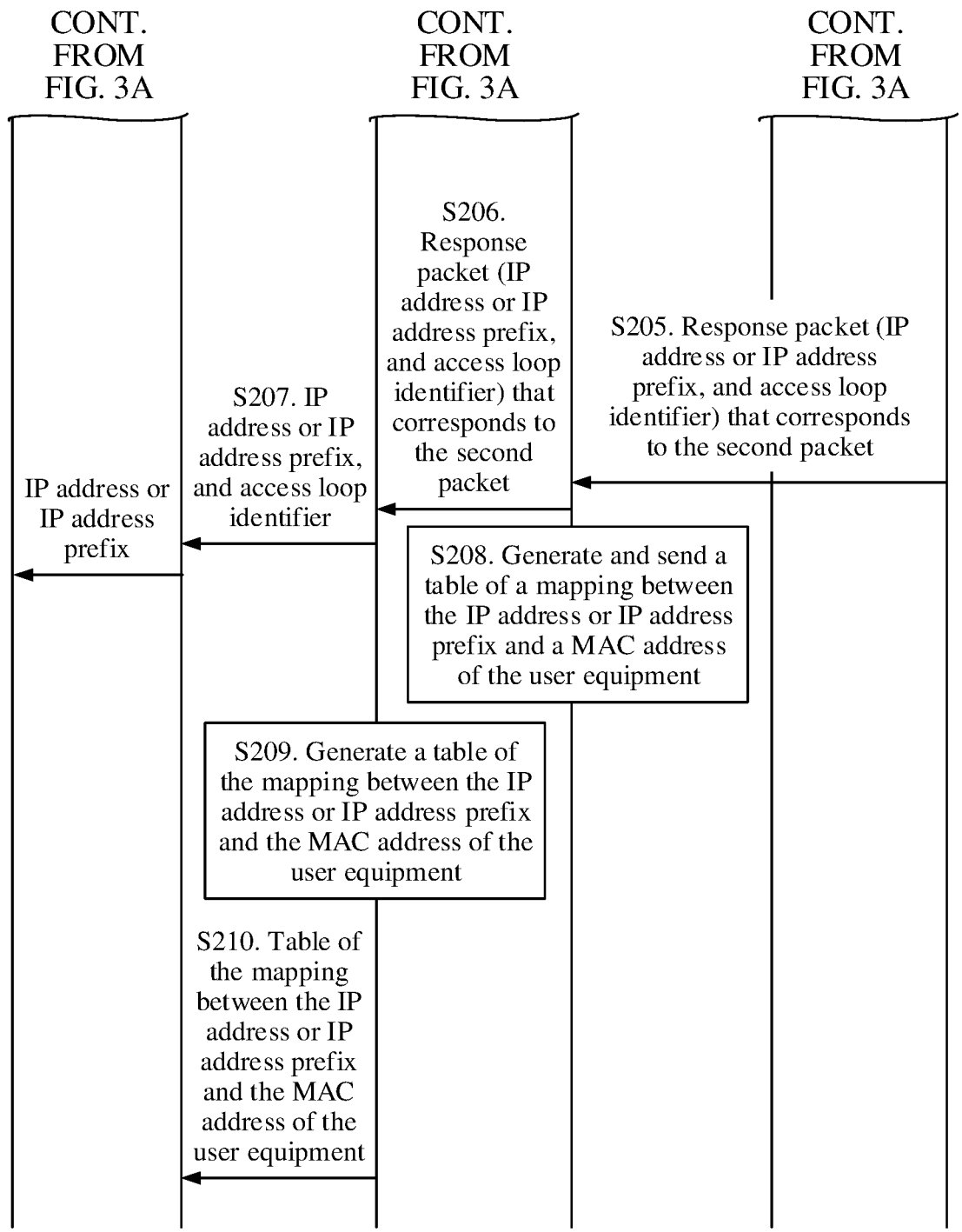

Based on the embodiment that corresponds to FIG. 2, optionally, before S204, authentication and authorization may be performed on the user equipment. Only after the user equipment is authenticated and authorized, the VNF SDN controller sends a second packet to the DHCP server, to request the DHCP server to assign an IP address or IP address prefix to the user equipment. FIG. 3A and FIG. 3B are a schematic diagram of another data transmission method according to an embodiment. S2031 to S2033 are a process in which a VNF SDN controller attempts to authenticate and authorize user equipment.

S2031. The VNF SDN controller obtains an access loop identifier from a second packet.

S2032. The VNF SDN controller sends an AAA authentication request packet to an AAA server.

The VNF SDN controller adds the obtained access loop identifier to the AAA authentication request packet, and then sends the AAA authentication request packet carrying the access loop identifier to the AAA server. AAA authentication may be based on a remote authentication dial-in user service (RADIUS) protocol or a diameter protocol.

In this embodiment, after obtaining the access loop identifier from the second packet, the VNF SDN controller adds the access loop identifier to the AAA authentication request packet, and sends the AAA authentication request packet to the AAA server, so that after receiving the AAA authentication request packet, the AAA server may attempt to authenticate and authorize the user equipment based on the access loop identifier, and send an AAA authorization response packet to the VNF SDN controller after determining that the user equipment is authenticated and authorized.

S2033. The VNF SDN controller receives the AAA authorization response packet sent by the AAA server.

It can be learned that, in this embodiment, the VNF SDN controller obtains the access loop identifier from the second packet, and sends the AAA authentication request packet to the AAA server. After the user equipment is authenticated and authorized, the VNF SDN controller receives the AAA authorization response packet sent by the AAA server, to complete authentication and authorization of the user equipment without an IP edge device. Therefore, complexity of the IP edge device is reduced, and network transmission efficiency is improved.

Only after it is determined, by using S2031 to S2033, that the user equipment is authenticated and authorized, S204 is performed, that is, the VNF SDN controller sends the second packet to a DHCP server, so that the DHCP server assigns an IP address or IP address prefix to the user equipment. After assigning the IP address or IP address prefix to the user equipment, the DHCP server may add the assigned IP address or IP address prefix to a response packet that corresponds to the second packet, and send the response packet to the VNF SDN controller, so that the VNF SDN controller sends the received response packet that corresponds to the second packet to a PNF SDN controller. Optionally, after S205 in which the PNF SDN controller receives the response packet that corresponds to the second packet and that is sent by the VNF SDN controller, to prevent MAC address spoofing and IP address spoofing or IP address prefix spoofing, the VNF SDN controller listens to the response packet that corresponds to the second packet, and generates a table of a mapping between the IP address or IP address prefix and a MAC address of the user equipment based on the response packet that corresponds to the second packet; and sends the table of the mapping between the IP address or IP address prefix and the MAC address of the user equipment to a virtualized data plane of the IP edge device, so as to improve network device security. For details, refer to S208.

S208. The VNF SDN controller generates the table of the mapping between the IP address or IP address prefix and the MAC address of the user equipment based on the response packet of the second packet, so that the VNF SDN controller sends the table of the mapping between the IP address or IP address prefix and the MAC address of the user equipment to the IP edge device.

In this embodiment, before the VNF SDN controller generates the table of the mapping between the IP address or IP address prefix and the MAC address of the user equipment by listening to the response packet that corresponds to the second packet, the VNF SDN controller needs to obtain the MAC address of the user equipment. A specific process may be: A first packet sent by the user equipment to an access device is carried in an Ethernet frame, and a source MAC address in a header of the Ethernet frame is the MAC address of the user equipment. After receiving the first packet, the access device extracts the source MAC address from the header of the Ethernet frame in which the first packet is located, and sends the MAC address to the PNF SDN controller. The PNF SDN controller sends the MAC address of the user equipment to the VNF SDN controller, so that the VNF SDN controller generates the table of the mapping between the IP address or IP address prefix and the MAC address of the user equipment based on the MAC address of the user equipment and the IP address or IP address prefix. The MAC address of the user equipment may be a MAC address of a customer-premises equipment (CPE) or a MAC address of user equipment UE. Optionally, that the PNF SDN controller obtains the MAC address of the user equipment may be implemented in step S201, or may be independently implemented.

After generating the table of the mapping between the IP address or IP address prefix and the MAC address of the user equipment, the VNF SDN controller may send the table of the mapping between the IP address or IP address prefix and the MAC address of the user equipment to the virtualized data plane of the IP edge device. Optionally, the VNF SDN controller may send the table of the mapping between the IP address or IP address prefix and the MAC address of the user equipment to the virtualized data plane of the IP edge device based on an OpenFlow protocol, a (NETCONF), a network management protocol, or a network control protocol, so that the IP edge device generates a table of a mapping between a local IP address or IP address prefix and the MAC address of the user equipment based on the received table of the mapping between the IP address or IP address prefix and the MAC address of the user equipment, so as to prevent MAC address spoofing and IP address spoofing or IP address prefix spoofing. Therefore, network device security is improved.

After the PNF SDN controller receives the response packet that corresponds to the second packet and that is sent by the VNF SDN controller, to prevent MAC address spoofing and IP address or IP address prefix spoofing, the PNF SDN controller listens to the response packet that corresponds to the second packet, and generates a table of the mapping between the IP address or IP address prefix and the MAC address of the user equipment based on the response packet that corresponds to the second packet; and sends the table of the mapping between the IP address or IP address prefix and the MAC address of the user equipment to the access device, so as to improve network device security. For details, refer to S209 to S210.

S209. The PNF SDN controller generates the table of the mapping between the IP address or IP address prefix and the MAC address of the user equipment based on the response packet that corresponds to the second packet.

S210. The PNF SDN controller sends the table of the mapping between the IP address or IP address prefix and the MAC address of the user equipment to the access device.

In this embodiment, before generating the table of the mapping between the IP address or IP address prefix and the MAC address of the user equipment based on the response packet that corresponds to the second packet, the PNF SDN controller needs to obtain the MAC address of the user equipment. A specific process may be: The first packet sent by the user equipment to the access device is carried in the Ethernet frame, and the source MAC address in the header of the Ethernet frame is the MAC address of the user equipment. After receiving the first packet, the access device extracts the source MAC address from the header of the Ethernet frame in which the first packet is located, and sends the MAC address to the PNF SDN controller, so that the PNF SDN controller generates the table of the mapping between the IP address or IP address prefix and the MAC address of the user equipment based on the MAC address of the user equipment and the IP address or IP address prefix.

After generating the table of the mapping between the IP address or IP address prefix and the MAC address of the user equipment, the PNF SDN controller may send the table of the mapping between the IP address or IP address prefix and the MAC address of the user equipment to the access device. Optionally, the PNF SDN controller may send the table of the mapping between the IP address or IP address prefix and the MAC address of the user equipment to the access device based on an OpenFlow protocol, a NETCONF protocol, a network management protocol, or a network control protocol, so that the access device generates a table of a mapping between a local IP address or IP address prefix and the MAC address of the user equipment based on the received table of the mapping between the IP address or IP address prefix and the MAC address of the user equipment, so as to prevent MAC address spoofing and IP address spoofing or IP address prefix spoofing. Therefore, network device security is improved.

Optionally, in the foregoing embodiment, either the PNF SDN controller or the VNF SDN controller may generate a table of a mapping between the IP address assigned to the user equipment and the MAC address of the user equipment, and send the generated table of the mapping to the other for storage.

Figure 4A:
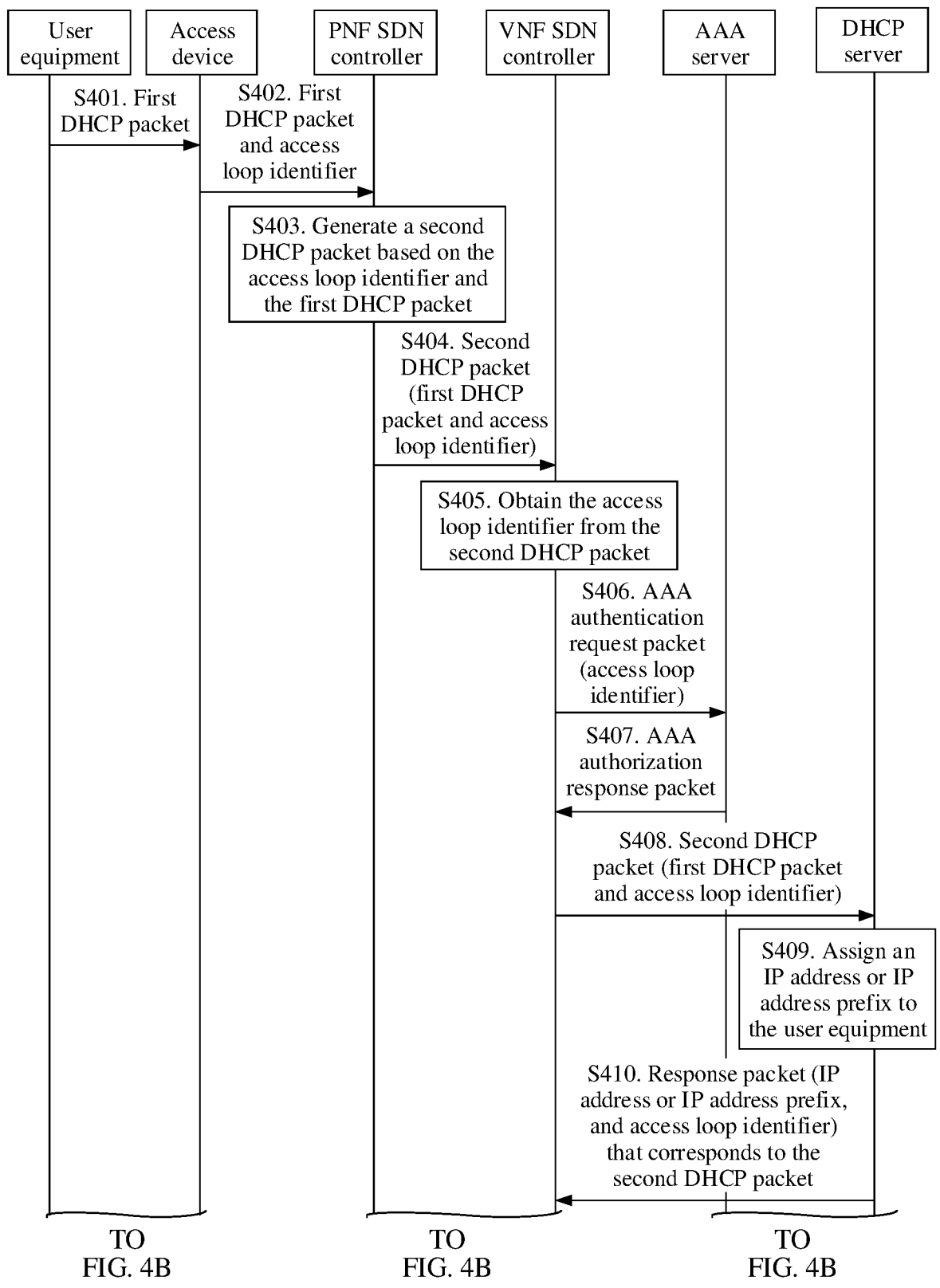
FIG. 4A and FIG. 4B are a schematic diagram of still another data transmission method according to an embodiment.
Figure 4B:
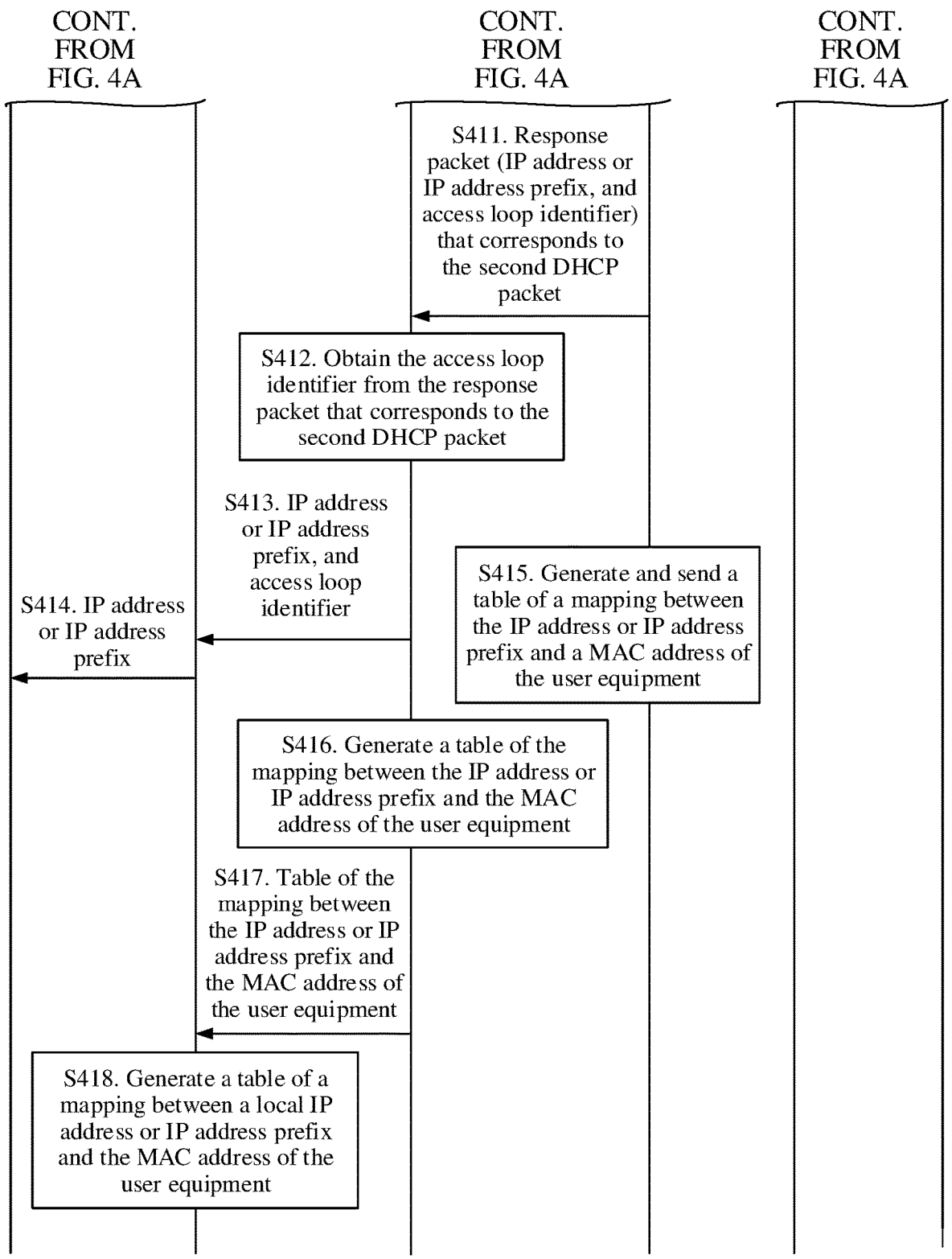

To describe the data transmission method provided in this embodiment more clearly, an example in which the first packet is the first DHCP packet is used. For details, refer to FIG. 4A and FIG. 4B. FIG. 4A and FIG. 4B are a schematic diagram of still another data transmission method according to an embodiment. The data transmission method may include the following steps.

S401. An access device receives a first DHCP packet sent by user equipment.

The first DHCP packet is used to request a DHCP server to assign an IP address or IP address prefix to the user equipment.

S402. The access device sends the first DHCP packet and an access loop identifier to a PNF SDN controller, where the access loop identifier is used to identify a physical port or logical port through which the access device receives the first DHCP packet and that is of the access device.

After receiving the first DHCP packet, the access device generates the access loop identifier that corresponds to the first DHCP packet, where the access loop identifier is used to identify the physical port or logical port through which the access device receives the first DHCP packet. For example, in a DSL/Ethernet access system, after receiving the first DHCP packet sent by the user equipment, the access device may generate the access loop identifier that corresponds to the first DHCP packet. A format of the access loop identifier is: Access-Node-Identifier eth slot/port [:vlan-id].

For example, the access device creates a first OpenFlow message, and extends OpenFlow, so that the first OpenFlow message (for example, a packet-in message) carries the corresponding access loop identifier of the access device and the first DHCP packet. Optionally, the first OpenFlow message further carries a MAC address of the user equipment that sends the first DHCP packet.

S403. The PNF SDN controller generates a second DHCP packet based on the access loop identifier and the first DHCP packet.

For example, the PNF SDN controller obtains the access loop identifier and the first DHCP packet from the first OpenFlow message, and may add the access loop identifier to a field options in the first DHCP packet, to generate a second DHCP packet. Alternatively, the PNF SDN controller obtains the access loop identifier and the first DHCP packet from the first OpenFlow message, and creates a second DHCP packet. The DHCP packet may be a DHCP discover packet or a DHCP request. For example, when the first DHCP packet is a first DHCP discover packet, the PNF SDN controller may add the access loop identifier to a field options in the first DHCP discover packet, to generate a second DHCP discover packet.

S404. The PNF SDN controller sends the second DHCP packet to a VNF SDN controller.

The second DHCP packet includes the access loop identifier.

Optionally, there may be two possible implementations in which the PNF SDN controller sends a second DHCP packet to the VNF SDN controller, which are specifically as follows:

In a first possible implementation, the PNF SDN controller sends the second DHCP packet to the VNF SDN controller through an interconnection interface between the PNF SDN controller and the VNF SDN controller. For example, the PNF SDN controller and the VNF SDN controller are interconnected based on a communications protocol supported by both of the PNF SDN controller and the VNF SDN controller.

In a second possible implementation, the PNF SDN controller sends the second DHCP packet to the VNF SDN controller by using an upper-level controller. For example, the upper-level controller may be an orchestrator. The PNF SDN controller forwards the second DHCP packet to the VNF SDN controller by using the orchestrator.

It should be noted that, in this embodiment, for details about how the PNF SDN controller sends the second DHCP packet to the VNF SDN controller, refer to the foregoing two possible implementations in which the PNF SDN controller and the VNF SDN controller transmit packets to each other. Details are not described in this disclosure.

It can be learned that, after receiving the first DHCP packet, the access device does not need to process the first DHCP packet and the access loop identifier, but needs to send the first DHCP packet and the access loop identifier to the PNF SDN controller. The PNF SDN controller processes the first DHCP packet and the access loop identifier to generate the second DHCP packet, and sends the second DHCP packet to the VNF SDN controller, so that the VNF SDN controller sends the second DHCP packet to the DHCP server, and the DHCP server assigns the IP address or IP address prefix to the user equipment. Therefore, complexity of the access device is reduced. In addition, when sending the second DHCP packet to the VNF SDN controller, the PNF SDN controller interacts with the VNF SDN controller, so that the PNF SDN controller does not need to forward the second DHCP packet to the VNF SDN controller by using the access device and an IP edge device, and data transmission efficiency is improved.

S405. The VNF SDN controller obtains the access loop identifier from the second DHCP packet.

S406. The VNF SDN controller sends an AAA authentication request packet to an AAA server.

The AAA authentication request packet includes the access loop identifier. AAA authentication may be based on a RADIUS protocol or a diameter protocol.

S407. The VNF SDN controller receives an AAA authorization response packet sent by the AAA server.

Authentication and authorization can be performed on the user equipment by using S405 to S407, and S408 is performed only after the user equipment is authenticated and authorized.

S408. The VNF SDN controller sends the second DHCP packet to the DHCP server. It can be learned that, in this embodiment, the VNF SDN controller may directly receive the second packet sent by the PNF SDN controller, so that the PNF SDN controller directly interacts with the VNF SDN controller and does not need to forward the second packet to the VNF SDN controller by using the access device and the IP edge device, and data transmission efficiency is improved.

S409. The DHCP server assigns the IP address or IP address prefix to the user equipment based on the second DHCP packet.

S410. The DHCP server sends a response packet that corresponds to the second DHCP packet to the VNF SDN controller.

The response packet that corresponds to the second DHCP packet includes the IP address or IP address prefix assigned to the user equipment, and the access loop identifier.

S411. The VNF SDN controller sends the response packet that corresponds to the second DHCP packet to the PNF SDN controller.

It should be noted that, in this embodiment, for details about how the VNF SDN controller sends the response packet that corresponds to the second DHCP packet to the PNF SDN controller, refer to the foregoing two possible implementations in which the PNF SDN controller and the VNF SDN controller transmit packets to each other. Details are not described in this disclosure.

S412. The PNF SDN controller separates the access loop identifier from the response packet that corresponds to the second DHCP packet.

Specifically, the PNF SDN controller separates the access loop identifier from the response packet that corresponds to the second DHCP packet to generate a third DHCP packet, where the third packet includes the IP address or IP address prefix assigned by the DHCP server to the user equipment.

S413. The PNF SDN controller sends the IP address or IP address prefix assigned to the user equipment, and the access loop identifier to the access device.

For example, the PNF SDN controller sends a second OpenFlow message to the access device, where the second OpenFlow message includes the IP address or IP address prefix assigned to the user equipment, and the access loop identifier.

S414. The access device sends the IP address or IP address prefix to the user equipment based on the access loop identifier, so as to complete processing and transmission of the first DHCP packet.

Optionally, before S411 in which the VNF SDN controller sends the response packet that corresponds to the second DHCP packet to the PNF SDN controller, the method may further include the following step.

S415. The VNF SDN controller generates a table of a mapping between the IP address or IP address prefix and the MAC address of the user equipment based on the response packet that corresponds to the second DHCP packet.

S415 is performed, so that the IP edge device generates a table of a mapping between a local IP address or IP address prefix and the MAC address of the user equipment based on the received table of the mapping between the IP address or IP address prefix and the MAC address of the user equipment, so as to prevent MAC address spoofing and IP address spoofing or IP address prefix spoofing. Therefore, network device security is improved.

It should be noted that, before generating the table of the mapping between the IP address or IP address prefix and the MAC address of the user equipment based on the response packet that corresponds to the second DHCP packet, the VNF SDN controller needs to obtain the MAC address of the user equipment. For the obtaining of the MAC address of the user equipment, refer to S208. Details are not described in this disclosure.

Optionally, before S413 in which the PNF SDN controller sends the IP address or IP address prefix assigned to the user equipment to the access device, the method may further include the following steps.

S416. The PNF SDN controller generates a table of a mapping between the IP address or IP address prefix and the MAC address of the user equipment based on the response packet that corresponds to the second DHCP packet.

S417. The PNF SDN controller sends the table of the mapping between the IP address or IP address prefix and the MAC address of the user equipment to the access device.

S418. The access device generates a table of a mapping between a local IP address or IP address prefix and the MAC address of the user equipment based on the received table of the mapping between the IP address or IP address prefix and the MAC address of the user equipment.

S416 to S418 is performed, so that the access device can generate the table of the mapping between the local IP address or IP address prefix and the MAC address of the user equipment based on the received table of the mapping between the IP address or IP address prefix and the MAC address of the user equipment, so as to prevent MAC address spoofing and IP address spoofing or IP address prefix spoofing. Therefore, network device security is improved.

It should be noted that, before generating the table of the mapping between the IP address or IP address prefix and the MAC address of the user equipment based on the response packet that corresponds to the second DHCP packet, the PNF SDN controller needs to obtain the MAC address of the user equipment. For the obtaining of the MAC address of the user equipment, refer to S208. Details are not described in this disclosure.

Figure 5A:
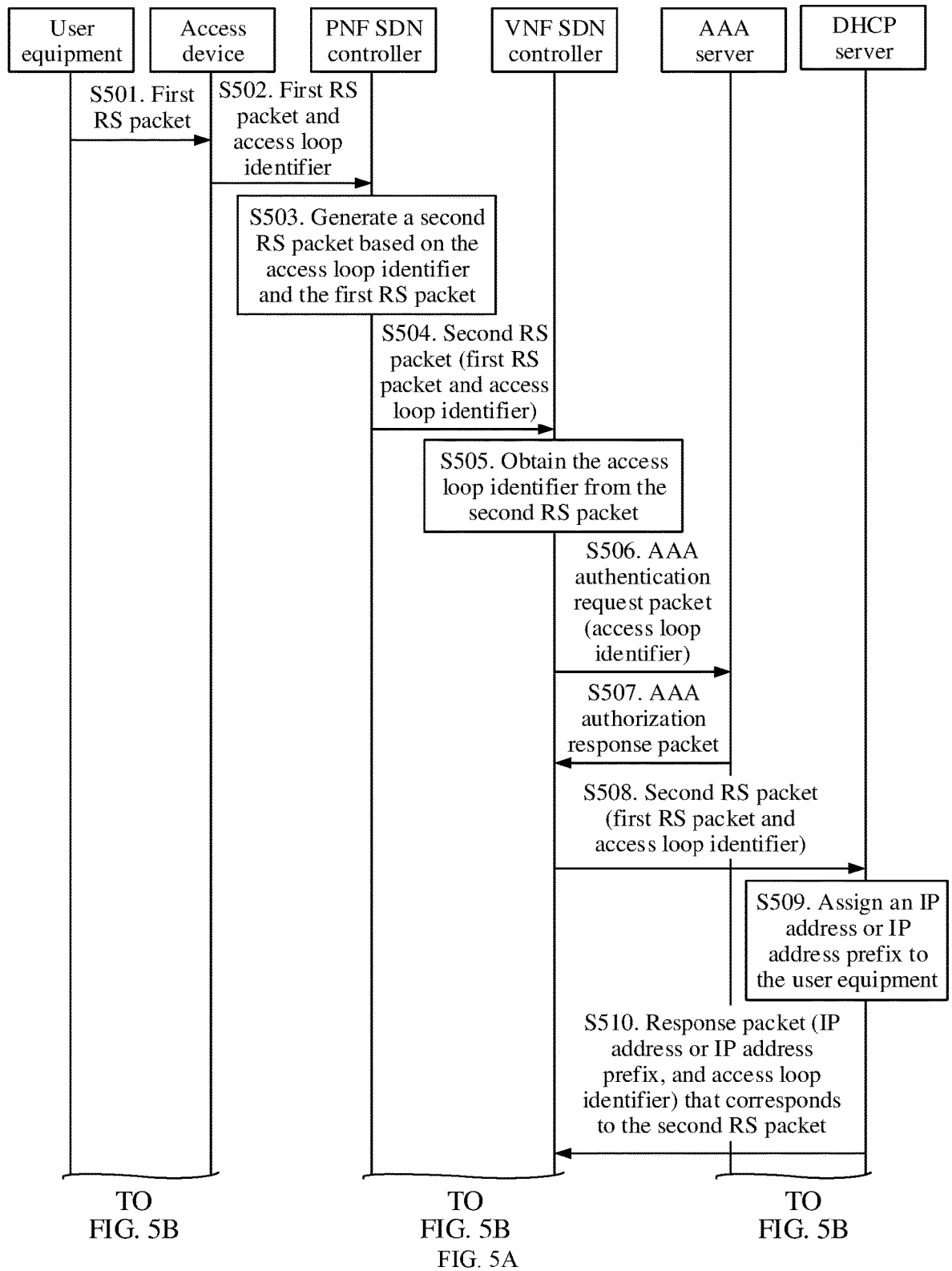
FIG. 5A and FIG. 5B are a schematic diagram of yet another data transmission method according to an embodiment.
Figure 5B:
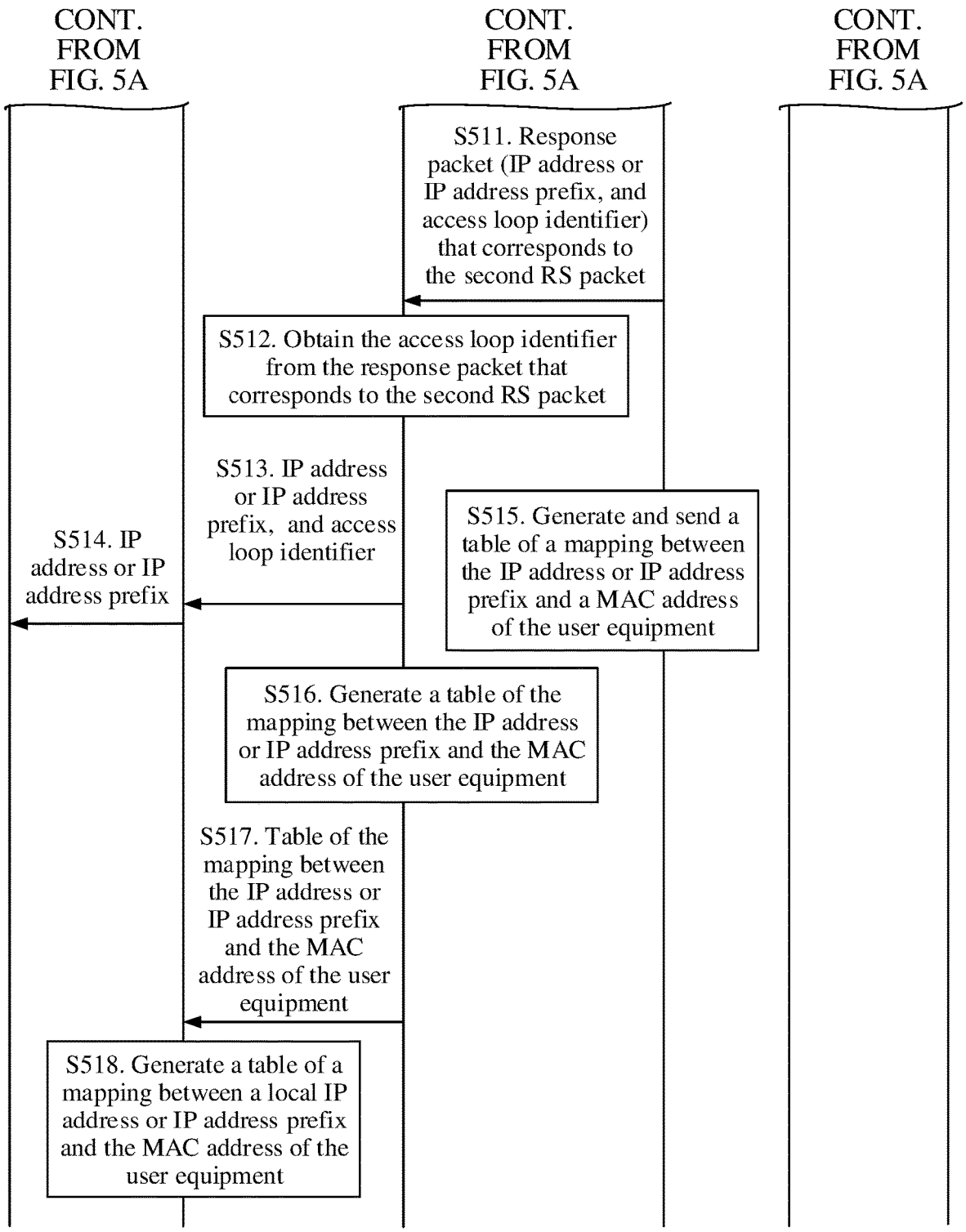

Certainly, the first packet may alternatively be the RS packet. An example in which the first packet is a first RS packet is used for description. For details, refer to FIG. 5A and FIG. 5B. FIG. 5A and FIG. 5B are a schematic diagram of yet another data transmission method according to an embodiment. The data transmission method may include the following steps.

S501. An access device receives a first RS packet sent by user equipment.

The first RS packet is used to request a DHCP server to assign an IP address or IP address prefix to the user equipment.

S502. The access device sends the first RS packet and an access loop identifier to the PNF SDN controller.

The access loop identifier is used to identify a physical port or logical port through which the access device receives the first RS packet. For example, in a DSL/Ethernet access system, after receiving the first RS packet sent by the user equipment, the access device may generate the access loop identifier that corresponds to the first RS packet. A format of the access loop identifier is: Access-Node-Identifier eth slot/port [:vlan-id].

For example, the access device creates a first OpenFlow message, and extends OpenFlow, so that the first OpenFlow message (for example, a packet-in message) carries the corresponding access loop identifier of the access device and the first RS packet. Optionally, the first OpenFlow message further carries a MAC address of the user equipment that sends the first RS packet.

S503. The PNF SDN controller generates a second RS packet based on the access loop identifier and the first RS packet.

For example, the PNF SDN controller receives the access loop identifier and the first RS packet, and may add the access loop identifier to a field options in the first RS packet, to generate a second RS packet. Alternatively, the PNF SDN controller obtains the access loop identifier and the first RS packet from the first OpenFlow message, and creates a second RS packet. The RS packet may be an RS discover packet or an RS request. For example, when the first RS packet is a first RS discover packet, the PNF SDN controller may add the access loop identifier to a field options in the first RS discover packet, to generate a second RS discover packet.

S504. The PNF SDN controller sends the second RS packet to a VNF SDN controller.

The second RS packet includes the access loop identifier.

Optionally, there may be two possible implementations in which the PNF SDN controller sends the second RS packet to the VNF SDN controller, which are specifically as follows:

In a first possible implementation, the PNF SDN controller sends the second RS packet to the VNF SDN controller through an interconnection interface between the PNF SDN controller and the VNF SDN controller. For example, the PNF SDN controller and the VNF SDN controller are interconnected based on a communications protocol supported by both of the PNF SDN controller and the VNF SDN controller.

In a second possible implementation, the PNF SDN controller sends the second RS packet to the VNF SDN controller by using an upper-level controller. For example, the upper-level controller may be an orchestrator. The PNF SDN controller forwards the first OpenFlow message to the VNF SDN controller by using the orchestrator.

It should be noted that, in this embodiment, for details about how the PNF SDN controller sends the second RS packet to the VNF SDN controller, refer to the foregoing two possible implementations in which the PNF SDN controller and the VNF SDN controller transmit packets to each other. Details are not described in this disclosure.

It can be learned that, after receiving the first RS packet, the access device does not need to process the first RS packet and the access loop identifier, but needs to send the first RS packet and the access loop identifier to the PNF SDN controller. The PNF SDN controller processes the first RS packet and the access loop identifier to generate the second RS packet, and sends the second RS packet to the VNF SDN controller, so that the VNF SDN controller sends the second RS packet to the DHCP server, and the DHCP server assigns the IP address or IP address prefix to the user equipment. Therefore, complexity of the access device is reduced. In addition, when sending the second RS packet to the VNF SDN controller, the PNF SDN controller interacts with the VNF SDN controller, so that the PNF SDN controller does not need to forward the second RS packet to the VNF SDN controller by using the access device and an IP edge device, and data transmission efficiency is improved.

S505. The VNF SDN controller obtains the access loop identifier from the second RS packet.

S506. The VNF SDN controller sends an AAA authentication request packet to an AAA server.

The AAA authentication request packet includes the access loop identifier.

S507. The VNF SDN controller receives an AAA authorization response packet sent by the AAA server.

Authentication and authorization can be performed on the user equipment by using S405 to S407, and S408 is performed only after the user equipment is authenticated and authorized.

S508. The VNF SDN controller sends the second RS packet to the DHCP server.

It can be learned that, in this embodiment, the VNF SDN controller may directly receive a second RS packet sent by the PNF SDN controller, so that the PNF SDN controller directly interacts with the VNF SDN controller and does not need to forward the second packet to the VNF SDN controller by using the access device and the IP edge device, and data transmission efficiency is improved.

S509. The DHCP server assigns the IP address or IP address prefix to the user equipment based on the second RS packet.

S510. The DHCP server sends a response packet that corresponds to the second RS packet to the VNF SDN controller.

The response packet that corresponds to the second RS packet includes the IP address or IP address prefix assigned to the user equipment, and the access loop identifier.

S511. The VNF SDN controller sends the response packet that corresponds to the second RS packet to the PNF SDN controller.

It should be noted that, in this embodiment, for details about how the VNF SDN controller sends the response packet that corresponds to the second RS packet to the PNF SDN controller, refer to the foregoing two possible implementations in which the PNF SDN controller and the VNF SDN controller transmit packets to each other. Details are not described in this disclosure.

S512. The PNF SDN controller separates the access loop identifier from the response packet that corresponds to the second RS packet.

S513. The PNF SDN controller sends the IP address or IP address prefix assigned to the user equipment, and the access loop identifier to the access device.

For example, the PNF SDN controller sends a second OpenFlow message to the access device, where the second OpenFlow message includes the IP address or IP address prefix assigned to the user equipment, and the access loop identifier.

S514. The access device sends the IP address or IP address prefix to the user equipment based on the access loop identifier, so as to complete processing and transmission of the first RS packet.

Optionally, before S511 in which the VNF SDN controller sends the response packet that corresponds to the second DHCP packet to the PNF SDN controller, the method may further include the following step.

S515. The VNF SDN controller generates a table of a mapping between the IP address or IP address prefix and the MAC address of the user equipment based on the response packet that corresponds to the second RS packet.

S515 is performed, so that the IP edge device generates a table of a mapping between a local IP address or IP address prefix and the MAC address of the user equipment based on the received table of the mapping between the IP address or IP address prefix and the MAC address of the user equipment, so as to prevent MAC address spoofing and IP address spoofing or IP address prefix spoofing. Therefore, network device security is improved.

It should be noted that, before generating the table of the mapping between the IP address or IP address prefix and the MAC address of the user equipment based on the response packet that corresponds to the second RS packet, the VNF SDN controller needs to obtain the MAC address of the user equipment. For the obtaining of the MAC address of the user equipment, refer to S208. Details are not described in this disclosure.

Optionally, before S513 in which the PNF SDN controller sends the IP address or IP address prefix assigned to the user equipment to the access device, the method may further include the following steps.

S516. The PNF SDN controller generates a table of a mapping between the IP address or IP address prefix and the MAC address of the user equipment based on the response packet that corresponds to the second RS packet.

S517. The PNF SDN controller sends the table of the mapping between the IP address or IP address prefix and the MAC address of the user equipment to the access device.

S518. The access device generates a table of a mapping between a local IP address or IP address prefix and the MAC address of the user equipment based on the received table of the mapping between the IP address or IP address prefix and the MAC address of the user equipment.

S516 to S518 is performed, so that the access device can generate the table of the mapping between the local IP address or IP address prefix and the MAC address of the user equipment based on the received table of the mapping between the IP address or IP address prefix and the MAC address of the user equipment, so as to prevent MAC address spoofing and IP address spoofing or IP address prefix spoofing. Therefore, network device security is improved.

It should be noted that, before generating the table of the mapping between the IP address or IP address prefix and the MAC address of the user equipment based on the response packet that corresponds to the second RS packet, the PNF SDN controller needs to obtain the MAC address of the user equipment. For the obtaining of the MAC address of the user equipment, refer to S208. Details are not described in this disclosure.

Figure 6:
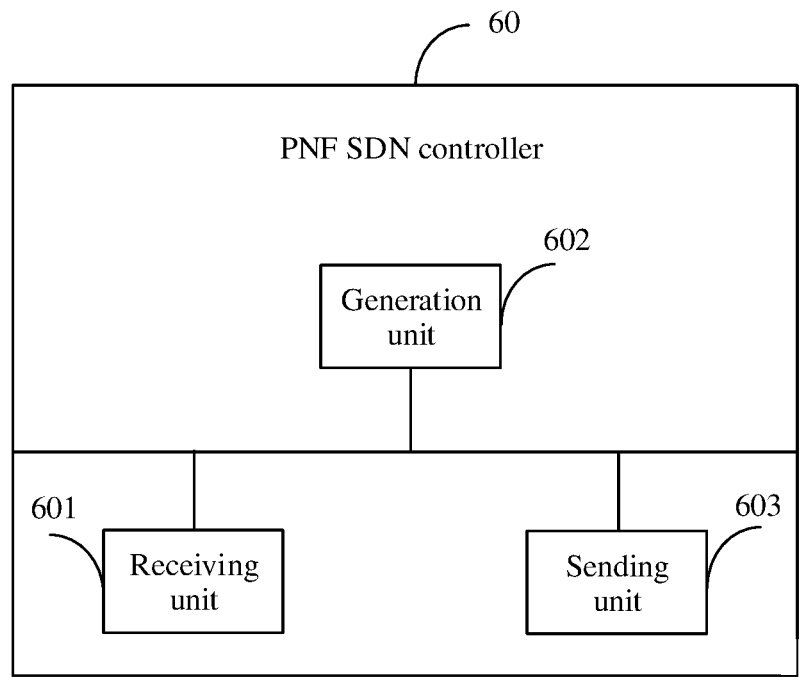
FIG. 6 is a schematic structural diagram of a PNF SDN controller according to an embodiment.

FIG. 6 is a schematic structural diagram of a PNF SDN controller 60 according to an embodiment. As shown in FIG. 6, the PNF SDN controller 60 may include a receiving unit 601, a generation unit 602, and a sending unit 603.

The receiving unit 601 is configured to receive a first packet and an access loop identifier that are sent by a first network device, where the access loop identifier is used to identify a physical port or logical port through which the first network device receives the first packet and that is of the first network device.

The generation unit 602 is configured to generate a second packet based on the access loop identifier and the first packet.

The sending unit 603 is configured to send the second packet to a virtualized network function software-defined networking VNF SDN controller, so that the VNF SDN controller sends the second packet to a second network device, where the second packet is used to request the second network device to assign an IP address or IP address prefix to user equipment.

Optionally, the receiving unit 601 is further configured to receive a response packet that corresponds to the second packet and that is sent by the VNF SDN controller, where the response packet that corresponds to the second packet includes the IP address or IP address prefix assigned by the second network device to the user equipment, and the access loop identifier.

The sending unit 603 is further configured to send the IP address or IP address prefix assigned to the user equipment, and the access loop identifier to the first network device.

Optionally, the sending unit 603 is further configured to send the second packet to the VNF SDN controller through an interconnection interface between the PNF SDN controller 60 and the VNF SDN controller.

Optionally, the sending unit 603 is further configured to send the second packet to the VNF SDN controller by using an upper-level controller.

Optionally, the generation unit 602 is further configured to generate a table of a mapping between the IP address or IP address prefix and a MAC address of the user equipment based on the response packet that corresponds to the second packet.

The sending unit 603 is further configured to send the table of the mapping between the IP address or IP address prefix and the MAC address of the user equipment to the first network device.

In a possible implementation, the receiving unit 601 receives the first packet and the access loop identifier, such as a first DHCP packet and the access loop identifier, or a first RS packet and the access loop identifier, that are sent by the access device. The access loop identifier is an identifier that can uniquely identify the access device and a physical port or logical port through which the access device receives a message and that is of the access device.

In another possible implementation, the generation unit 602 adds the access loop identifier to the first packet, to generate the second packet. Alternatively, the generation unit 602 creates a new second packet based on the access loop identifier and the first packet, where the second packet carries the access loop identifier and the first packet. The first packet and the second packet may have a same type or different types.

Further, the sending unit 603 may specifically send the second packet to the VNF SDN controller through the interconnection interface between the PNF SDN controller 60 and the VNF SDN controller. The second packet sent by the sending unit 603 and the first packet may have a same type or different types. For example, the type of the second packet may be determined based on a communications protocol between the PNF SDN controller 60 and the VNF SDN controller.

Further, the sending unit 603 may specifically send the second packet to the VNF SDN controller by using the upper-level controller. For example, the PNF SDN controller 60 sends the second packet to the VNF SDN controller by using an orchestrator.

With reference to the foregoing implementations, the receiving unit 601 is further configured to receive the MAC address of the user equipment sent by the access device. For a manner in which the access device obtains the MAC address of the user equipment, refer to the method in FIG. 2.

With reference to the foregoing implementations, the first packet and the access loop identifier may be included in an OpenFlow message.

In a product deployment mode, the PNF SDN controller 60, for example, may run on a server device or a telecommunications device, or may be an independent device.

The packet processing methods and specific examples of the PNF SDN controllers in the foregoing embodiments in FIG. 1 to FIG. 5A and FIG. 5B are also applicable to the PNF SDN controller 60 in this embodiment. According to the foregoing detailed descriptions of the packet processing methods, a person skilled in the art can clearly understand an implementation of the PNF SDN controller 60 in this embodiment. Therefore, for brevity of the specification, details are not described herein.

Figure 7:
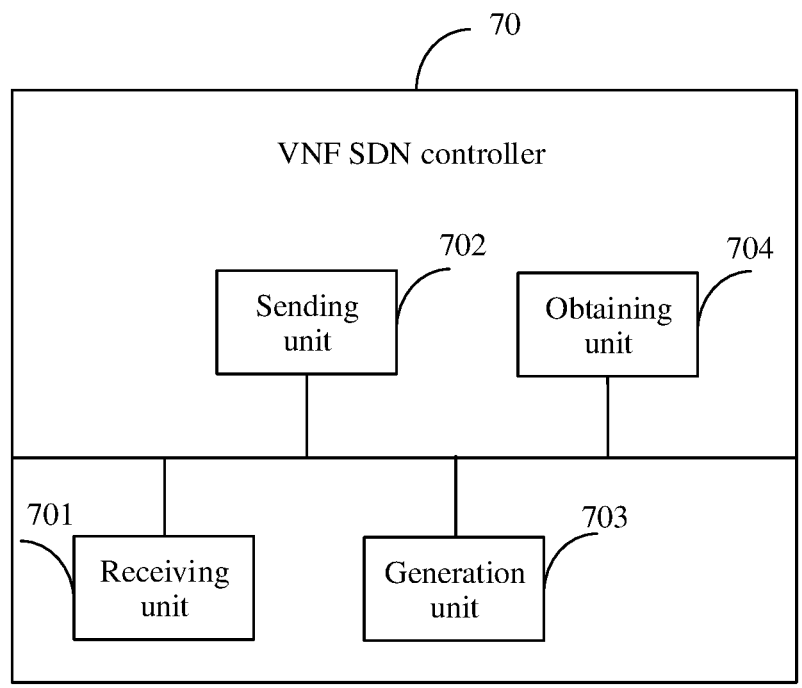
FIG. 7 is a schematic structural diagram of a VNF SDN controller according to an embodiment.

FIG. 7 is a schematic structural diagram of a VNF SDN controller 70 according to an embodiment. As shown in FIG. 7, the VNF SDN controller 70 may include a receiving unit 701 and a sending unit 702.

The receiving unit 701 is configured to receive a second packet sent by a PNF SDN controller, where the second packet is generated by the PNF SDN controller based on an access loop identifier and a first packet.

The sending unit 702 is configured to send the second packet to a second network device, where the second packet is used to request the second network device to assign an IP address or IP address prefix to user equipment, and the access loop identifier is used to identify a physical port or logical port through which a first network device receives the first packet and that is of the first network device.

Optionally, the receiving unit 701 is further configured to receive a response packet that corresponds to the second packet and that is sent by the second network device, where the response packet that corresponds to the second packet includes the IP address or IP address prefix assigned by the second network device to the user equipment, and the access loop identifier.

The sending unit 702 is further configured to send the response packet that corresponds to the second packet to the PNF SDN controller.

Optionally, the receiving unit 701 is further configured to receive, through an interconnection interface between the VNF SDN controller 70 and the PNF SDN controller, the second packet sent by the PNF SDN controller.

Optionally, the receiving unit 701 is further configured to receive, by using an upper-level controller, the second packet sent by the PNF SDN controller.

Optionally, the VNF SDN controller 70 may further include: a generation unit 703 configured to generate a table of a mapping between the IP address or IP address prefix and a MAC address of the user equipment based on the response packet that corresponds to the second packet.

The sending unit 702 is further configured to send the table of the mapping between the IP address or IP address prefix and the MAC address of the user equipment to a third network device.

Optionally, the VNF SDN controller 70 may further include: an obtaining unit 704 configured to obtain the access loop identifier from the second packet.

The sending unit 702 is further configured to send an authentication request packet to a fourth network device, where the authentication request packet includes the access loop identifier.

The receiving unit 701 is further configured to receive an authorization response packet sent by the fourth network device.

In a product form, the VNF SDN controller 70, for example, may run on a server device or a telecommunications device, or may be an independent device.

Figure 8:
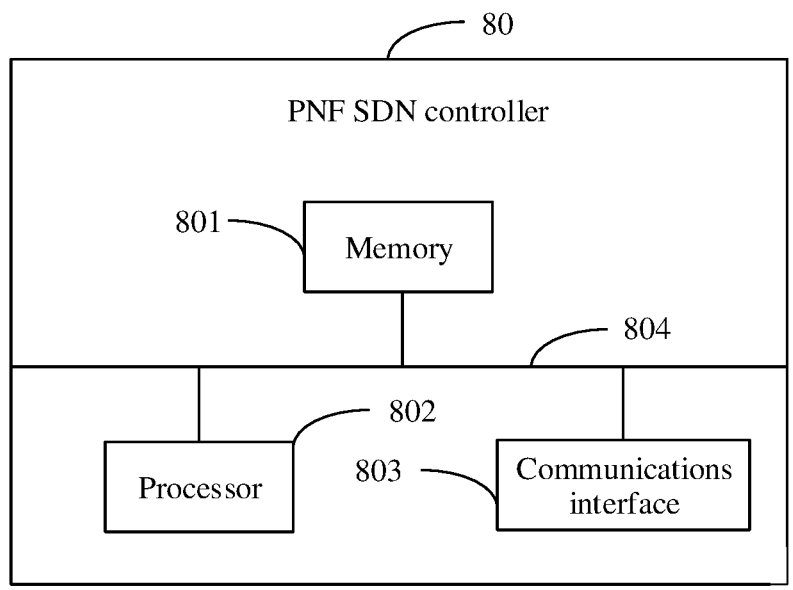
FIG. 8 is a schematic structural diagram of another PNF SDN controller according to an embodiment.

The packet processing methods and specific examples of the VNF SDN controllers in the foregoing embodiments in FIG. 1 to FIG. 5A and FIG. 5B are also applicable to the VNF SDN controller 70 in this embodiment. According to the foregoing detailed descriptions of the packet processing methods, a person skilled in the art can clearly understand an implementation of the VNF SDN controller 70 in this embodiment. Therefore, for brevity of the specification, details are not described herein. FIG. 8 is a schematic structural diagram of another PNF SDN controller 80 according to an embodiment. As shown in FIG. 8, the PNF SDN controller 80 may include a communications interface 803 and a processor 802.

The communications interface 803 is configured to: receive a first packet and an access loop identifier that are sent by a first network device, where the access loop identifier is used to identify a physical port or logical port through which the first network device receives the first packet and that is of the first network device; and send a generated second packet to a VNF SDN controller.

Optionally, the communications interface 803 may be further configured to: receive a response packet that corresponds to the second packet and that is sent by the VNF SDN controller, where the response packet that corresponds to the second packet includes an IP address or IP address prefix assigned to user equipment, and the access loop identifier; send the IP address or IP address prefix assigned to the user equipment, and the access loop identifier to the first network device; and send a table of a mapping between the IP address or IP address prefix and a MAC address of the user equipment to the first network device.

The processor 802 is configured to: execute a program stored in a memory, and when the program is executed, generate the second packet based on the access loop identifier and the first packet, where the second packet includes the first packet and the access loop identifier; and process the response packet that corresponds to the second packet, and separate the access loop identifier from the response packet that corresponds to the second packet to generate a third packet, where the third packet includes the access loop identifier and the response packet that corresponds to the second packet.

Optionally, the processor 802 is further configured to generate the table of the mapping between the IP address or IP address prefix and the MAC address of the user equipment based on the response packet that corresponds to the second packet.

Optionally, the PNF SDN controller may further include a memory 801 configured to store a program.

The PNF SDN controller 80 may further include a bus architecture (represented by a bus 804). The bus 804 may include any quantity of interconnected buses and bridges. The bus 804 interconnects various circuits of one or more processors represented by the processor 802, a memory represented by the memory 801, and the communications interface 803. The bus 804 may further interconnect various other circuits, such as a peripheral device, a voltage stabilizer, and a power management circuit. These are all well known in the art, and therefore are not further described in this specification.

Figure 9:
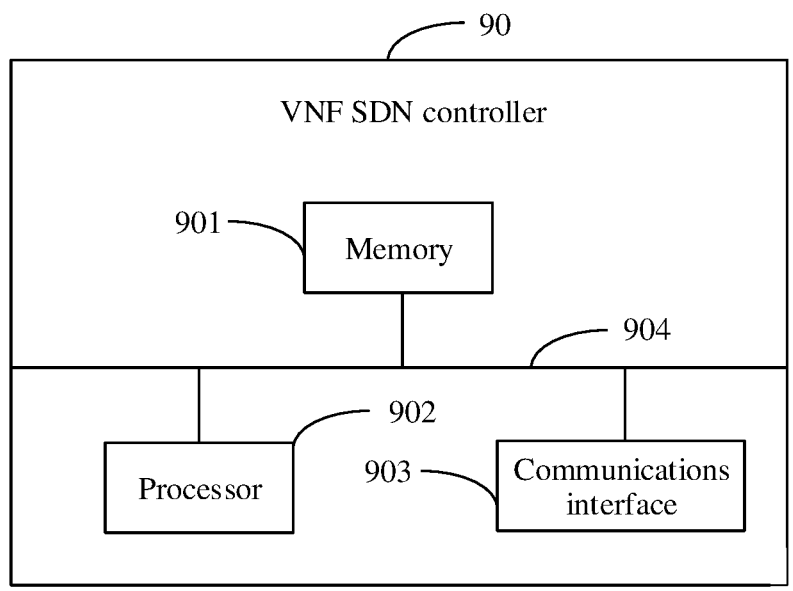
FIG. 9 is a schematic structural diagram of another VNF SDN controller according to an embodiment.

The packet processing methods and specific examples of the PNF SDN controllers in the foregoing embodiments in FIG. 1 to FIG. 5A and FIG. 5B are also applicable to the PNF SDN controller 80 in this embodiment. According to the foregoing detailed descriptions of the packet processing methods, a person skilled in the art can clearly understand an implementation of the PNF SDN controller in this embodiment. Therefore, for brevity of the specification, details are not described herein. FIG. 9 is a schematic structural diagram of another VNF SDN controller 90 according to an embodiment. As shown in FIG. 9, the VNF SDN controller 90 may include a communications interface 903.

The communications interface 903 is configured to: receive a second packet sent by a physical network function software-defined networking PNF SDN controller, where the second packet is generated by the PNF SDN controller based on an access loop identifier and a first packet; and send the second packet to a second network device, where the second packet is used to request the second network device to assign an IP address or IP address prefix to user equipment, and the access loop identifier is used to identify a physical port or logical port through which the first network device receives the first packet and that is of the first network device.

Optionally, the communications interface 903 may be further configured to: receive a response packet that corresponds to the second packet and that is sent by the second network device, where the response packet that corresponds to the second packet includes the IP address or IP address prefix assigned to the user equipment, and the access loop identifier; send the response packet that corresponds to the second packet to the PNF SDN controller; receive a MAC address of the user equipment sent by the PNF SDN controller; send a table of a mapping between the IP address or IP address prefix and the MAC address of the user equipment to a third network device; obtain the access loop identifier from the second packet; send an authentication request packet to a fourth network device, where the authentication request packet includes the access loop identifier; and receive an authorization response packet sent by the fourth network device.

Optionally, the VNF SDN controller may further include a memory 901 configured to store a program.

Optionally, the VNF SDN controller may further include a processor 902 configured to: execute the program stored in the memory, and when the program is executed, generate the table of the mapping between the IP address or IP address prefix and the MAC address of the user equipment based on the response packet that corresponds to the second packet.

The VNF SDN controller 90 may further include a bus architecture (represented by a bus 904). The bus 904 may include any quantity of interconnected buses and bridges. The bus 904 interconnects various circuits of one or more processors represented by the processor 902, a memory represented by the memory 901, and the communications interface 903. The bus 904 may further interconnect various other circuits, such as a peripheral device, a voltage stabilizer, and a power management circuit. These are all well known in the art, and therefore are not further described in this specification.

The packet processing methods and specific examples of the VNF SDN controllers in the foregoing embodiments in FIG. 1 to FIG. 5A and FIG. 5B are also applicable to the VNF SDN controller 90 in this embodiment. According to the foregoing detailed descriptions of the packet processing methods, a person skilled in the art can clearly understand an implementation of the VNF SDN controller 90 in this embodiment. Therefore, for brevity of the specification, details are not described herein.

Figure 10:
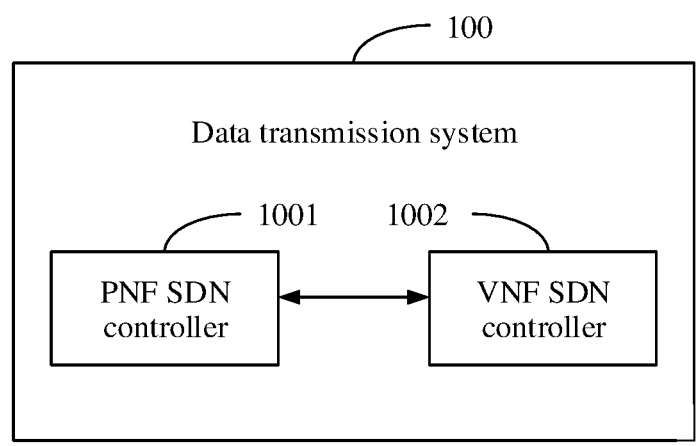
FIG. 10 is a schematic structural diagram of a data transmission system according to an embodiment.

FIG. 10 is a schematic diagram of a data transmission system 100 according to an embodiment. As shown in FIG. 10, the data transmission system 100 may include: a PNF SDN controller 1001 shown in any one of the foregoing embodiments and a VNF SDN controller 1002 shown in any one of the foregoing embodiments.

The packet processing methods and specific examples of the PNF SDN controller 1001 and the VNF SDN controller 1002 that are in the foregoing embodiments in FIG. 1 to FIG. 5A and FIG. 5B are also applicable to the data transmission system in this embodiment. According to the foregoing detailed descriptions of the packet processing methods, a person skilled in the art can clearly understand an implementation of the data transmission system 100 in this embodiment. Therefore, for brevity of the specification, details are not described herein.

A person skilled in the art should understand that the embodiments may be provided as a method, a system, or a computer program product. Therefore, this disclosure may use a form of hardware-only embodiments, software only embodiments, or embodiments with a combination of software and hardware. Moreover, this disclosure may use a form of a computer program product that is implemented on one or more computer-usable storage media (including but not limited to a disk memory, an optical memory, and the like) that include computer-usable program code.

This disclosure is described with reference to the flowcharts and/or block diagrams of the method, the device (or system), and the computer program product according to the embodiments. It should be understood that, computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by the computer or the processor of the any other programmable data processing device generate an apparatus for implementing a specific function in one or more processes in the flowcharts and/or in one or more blocks in the block diagrams.

These computer program instructions may be alternatively stored in a computer readable memory that can instruct a computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or any other programmable data processing device, so that a series of operations and steps are performed on the computer or any other programmable device, thereby generating computer-implemented processing. Therefore, the instructions executed on the computer or any other programmable device provide steps for implementing a specific function in one or more processes in the flowcharts and/or in one or more blocks in the block diagrams.

All or some of the foregoing embodiments may be implemented by using software, hardware, firmware, or any combination thereof. When the embodiments are implemented by using software, all or some of the embodiments may be implemented in a form of a computer program product. The computer program product includes one or more computer instructions. When the computer program instructions are loaded and executed on a computer, all or some of the procedure or functions according to the embodiments of the present disclosure are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a DSL line) or wireless (for example, infrared, radio, or microwave) manner. The computer-readable storage medium may be any available medium accessible to a computer, or a data storage device, such as a server or a data center, integrating one or more available media. The available medium may be a magnetic medium (for example, a floppy disk, a hard disk, or a magnetic tape), an optical medium (for example, a digital versatile disc (DVD)), a semiconductor medium (for example, a solid-state (SSD)), or the like.

It is clear that, the person skilled in the art can make various modifications and variations to this disclosure without departing from the scope of this disclosure. This disclosure is intended to cover these modifications and variations of this disclosure provided that they fall within the scope of protection defined by the following claims and their equivalent technologies.

What is claimed is:

1. A data transmission method implemented by a physical network function software-defined networking (PNF SDN) controller, the data transmission method comprising:
   receiving, from a first network device, a first packet originating from a terminal device;
   receiving, from the first network device, an access loop identifier, wherein the access loop identifier identifies a physical port or a logical port of the first network device and through which the first network device receives the first packet;
   generating a second packet comprising the first packet and the access loop identifier; and
   sending, to a virtualized network function software-defined networking (VNF SDN) controller, the second packet to prompt the VNF SDN controller to send the second packet to a second network device,
   wherein the second packet requests that the second network device assign an Internet Protocol (IP) address or an IP address prefix to the terminal device.

2. The data transmission method of claim 1, wherein after sending the second packet, the data transmission method further comprises:
   receiving, from the VNF SDN controller, a response packet corresponding to the second packet, wherein the response packet comprises the access loop identifier and either the IP address or the IP address prefix; and
   sending, to the first network device, the access loop identifier and either the IP address or the IP address prefix.

3. The data transmission method of claim 1, further comprising further sending the second packet through an interconnection interface between the PNF SDN controller and the VNF SDN controller.

4. The data transmission method of claim 1, further comprising further sending the second packet using an upper-level controller.

5. The data transmission method of claim 2, wherein after receiving the response packet, the data transmission method further comprises:
   generating, based on the response packet, a table mapping a media access control (MAC) address of the terminal device to either the IP address or the IP address prefix; and
   sending, to the first network device, the table.

6. A physical network function software-defined networking (PNF SDN) controller comprising:
   a communications interface configured to:
      receive, from a first network device, a first packet originating from a terminal device; and
      receive, from the first network device, an access loop identifier, wherein the access loop identifier identifies a physical port or a logical port of the first network device and through which the first network device receives the first packet; and a processor coupled to the communications interface and configured to generate a second packet comprising the first packet and the access loop identifier, wherein the communications interface is further configured to send, to a virtualized network function software-defined networking (VNF SDN) controller, that the second packet to prompt the VNF SDN controller to send the second packet to a second network device, wherein the second packet requests that the second network device assign an Internet Protocol (IP) address or an IP address prefix to the terminal device.

7. The PNF SDN controller of claim 6, wherein the communications interface is further configured to:
receive, from the VNF SDN controller, a response packet corresponding to the second packet, wherein the response packet comprises the access loop identifier and either the IP address or the IP address prefix; and
send, to the first network device, the access loop identifier and either the IP address or the IP address prefix.

8. The PNF SDN controller of claim 6, wherein the communications interface is further configured to further send the second packet through an interconnection interface between the PNF SDN controller and the VNF SDN controller.

9. The PNF SDN controller of claim 6, wherein the communications interface is further configured to further send the second packet using an upper-level controller.

10. The PNF SDN controller of claim 7, wherein after the communications interface receives the response packet, the processor is further configured to generate, based on the response packet, a table mapping a media access control (MAC) address of the terminal device to either the IP address or the IP address prefix, and wherein the communications interface is further configured to send, to the first network device, the table.

11. A virtualized network function software-defined networking (VNF SDN) controller comprising:
a processor; and
a communications interface coupled to the processor and configured to:
receive, from a physical network function software-defined networking (PNF SDN) controller, a second packet that is based on an access loop identifier and that is based on a first packet that originates from a terminal device; and
send, to a second network device, the second packet to request that the second network device assign an Internet Protocol (IP) address or an IP address prefix to the terminal device,
wherein the access loop identifier identifies a physical port or a logical port of a first network device and through which the first network device receives the first packet.

12. The VNF SDN controller of claim 11, wherein the communications interface is further configured to:
receive, from the second network device, a response packet corresponding to the second packet, wherein the response packet comprises the access loop identifier and either the IP address or the IP address prefix; and
send, to the PNF SDN controller, the response packet.

13. The VNF SDN controller of claim 11, wherein the communications interface is further configured to receive, from the PNF SDN controller and through an interconnection interface between the VNF SDN controller and the PNF SDN controller, the second packet.

14. The VNF SDN controller of claim 11, wherein the communications interface is further configured to receive, from the PNF SDN controller and using an upper-level controller, the second packet.

15. The VNF SDN controller of claim 12, wherein the processor is configured to generate, based on the response packet, a table mapping a media access control (MAC) address of the terminal device to either the IP address or the IP address prefix, and wherein the communications interface is further configured to send, to a third network device, the table.

16. The VNF SDN controller of claim 11, wherein the processor is further configured to obtain the access loop identifier from the second packet, and wherein the communications interface is further configured to:
send, to a fourth network device, an authentication request packet comprising the access loop identifier; and
receive, from the fourth network device, an authorization response packet.

17. A data transmission system comprising:
a physical network function software-defined networking (PNF SDN) controller configured to:
receive, from a first network device, a first packet originating from a terminal device;
receive, from the first network device, an access loop identifier, wherein the access loop identifier identifies a physical port or a logical port of the first network device and through which the first network device receives the first packet;
generate a second packet comprising the first packet and the access loop identifier; and
send the second packet;
a virtualized network function software-defined networking (VNF SDN) controller configured to:
receive, from the PNF SDN controller, the second packet; and
send, to a second network device, the second packet to request that the second network device assign an Internet Protocol (IP) address or an IP address prefix to the terminal device.

18. The data transmission system of claim 17, wherein the access loop identifier identifies the physical port, but not the logical port.

19. The data transmission system of claim 17, wherein the access loop identifier identifies the logical port, but not the physical port.

20. The data transmission system of claim 17, wherein the VNF SDN controller is further configured to further send the second packet to request the second network device to assign the IP address, but not the IP address prefix.

* * * * *